United States Patent
Gallardo

(10) Patent No.: US 10,474,304 B1
(45) Date of Patent: Nov. 12, 2019

(54) PROGRAMMABLE ACTIVE MATRIX OF ELECTRODES

(71) Applicant: Sharp Kabushiki Kaisha, Osaka (JP)

(72) Inventor: Diego Gallardo, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 24 days.

(21) Appl. No.: 15/978,306

(22) Filed: May 14, 2018

(51) Int. Cl.
G06F 3/044 (2006.01)
G06F 3/041 (2006.01)
G09G 3/3275 (2016.01)
G09G 3/3225 (2016.01)

(52) U.S. Cl.
CPC ............ *G06F 3/044* (2013.01); *G06F 3/0412* (2013.01); *G06F 3/0416* (2013.01); *G09G 3/3225* (2013.01); *G09G 3/3275* (2013.01); *G06F 3/0446* (2019.05); *G06F 2203/04113* (2013.01); *G09G 2300/0809* (2013.01); *G09G 2310/027* (2013.01)

(58) Field of Classification Search
CPC ...... G06F 3/044; G06F 3/0412; G06F 3/0416; G06F 3/0446; G06F 2203/04113; G09G 3/3275; G09G 3/3225; G09G 2310/027; G09G 2300/0809; G11C 11/5642; G11C 16/26; G11C 2013/0042
See application file for complete search history.

(56) References Cited

U.S. PATENT DOCUMENTS

| | | | |
|---|---|---|---|
| 4,293,734 A | 10/1981 | Pepper, Jr. | |
| 5,748,160 A | 5/1998 | Shieh et al. | |
| 5,841,078 A | 11/1998 | Miller et al. | |
| 7,859,521 B2 | 12/2010 | Hotelling et al. | |
| 8,054,300 B2 | 11/2011 | Bernstein | |
| 8,390,582 B2 | 3/2013 | Hotelling et al. | |
| 8,405,587 B2 | 3/2013 | Nathan et al. | |
| 9,741,292 B2 | 8/2017 | Nathan et al. | |
| 2002/0051381 A1* | 5/2002 | Numata | G11C 11/15 365/171 |
| 2008/0198655 A1* | 8/2008 | Keller | G11C 5/04 365/185.05 |
| 2014/0078096 A1 | 3/2014 | Tan et al. | |

(Continued)

FOREIGN PATENT DOCUMENTS

| | | |
|---|---|---|
| WO | WO 2003025893 | 3/2003 |
| WO | WO 2017056500 | 4/2017 |

*Primary Examiner* — Darlene M Ritchie
(74) *Attorney, Agent, or Firm* — Renner, Otto, Boisselle & Sklar, LLP

(57) ABSTRACT

An electrode array device has integrated programming circuitry within the unit cells for stable connection of individual electrode elements of the unit cells to one or more control signal lines. An array of unit cells are arranged in a two-dimensional array of rows and columns. Each unit cell includes an individual electrode element that is electrically connectable to at least one function line, and programming circuitry that is integrated into the unit cell and is operable to place the unit cell in a plurality of connection states corresponding to different states of electrical connection or disconnection to the at least one function line. The unit cells are individually selectable for programming and operation in one of the plurality of connection states. The programming circuitry includes storage elements and electronic switches that are operable to place the unit cells in different connection states.

21 Claims, 17 Drawing Sheets

(56) References Cited

U.S. PATENT DOCUMENTS

2016/0163253 A1* 6/2016 Chaji .................. G09G 3/2011
                                                    345/691
2016/0179251 A1* 6/2016 Lee .................... G06F 3/044
                                                    345/174
2019/0035476 A1* 1/2019 Lee .................... G11C 16/24

* cited by examiner

Fig. 11A Programming Mode

Fig. 11B Operation Mode

PROGRAMMABLE ACTIVE MATRIX OF ELECTRODES

TECHNICAL FIELD

The present invention relates to devices and applications including arrays of electrodes, and programmable arrays of electrodes in particular in which the connections of the electrode elements to external signal lines can be electrically programmed. Such type of electrode arrays may find application in a range of electronic devices and equipment, including for example touch panels, sensors, actuators, displays, and RF antennae arrays.

BACKGROUND ART

The present invention is described largely in connection with an exemplary usage in touch panels. It will be appreciated that principles of this invention are applicable to other fields employing electrode arrays, being more broadly applicable to networks of switchable sensing and/or driving electrodes, such as for example display devices generally, sensors, and radio frequency (RF) antennae arrays as mentioned above. Given the significant application to touch panels as a principal example, background technology pertaining to touch panels is described in this section, with the principles of the invention being expandable to other electrode array fields.

Touch panels have become widely adopted as the input device for a range of electronic products such as smartphones, tablet devices, and computers. Most high-end portable and handheld electronic devices now include touch panels. These are most often used as part of a touchscreen, i.e., a display and a touch panel that are aligned so that the touch zones of the touch panel correspond with display zones of the display.

The most common user interface for electronic devices with touchscreens is an image on the display, the image having points that appear interactive. For example, the device may display a picture of a button, and the user can then interact with the device by touching, pressing or swiping the button with a finger or with a stylus. For example, the user can "press" the button and the touch panel detects the touch (or touches). In response to the detected touch or touches, the electronic device carries out some appropriate function. For example, the electronic device may turn itself off, execute an application, perform some manipulation operation, and the like.

Although, a number of different technologies can be used to create touch panels, capacitive systems have proven to be the most popular due to their accuracy, durability, and ability to detect touch input events with little or no activation force. A basic method of capacitive sensing for touch panels is the surface capacitive method—also known as self-capacitance—for example as disclosed in U.S. Pat. No. 4,293,734 (Pepper, issued Oct. 6, 1981). A conventional implementation of a surface capacitance type touch panel is illustrated in FIG. 1, which includes a transparent substrate 10, the surface of which is coated with a conductive material that forms a sensing electrode 11. One or more voltage sources 12 are connected to the sensing electrode, for example at each corner, and are used to generate an electrostatic field above the substrate. When an input object 13 that is electrically conductive—such as a human finger—comes into close proximity to the sensing electrode, a capacitor 14 is dynamically formed between the sensing electrode 11 and the input object 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12, and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels is the projected capacitive method—also known as mutual capacitance. In this method, as shown in FIG. 2, a drive electrode 20 and sense electrode 21 are formed on a transparent substrate (not shown). A changing voltage or excitation signal is applied to the drive electrode 20 from a voltage source 22. A signal is then generated on the adjacent sense electrode 21 by capacitive coupling via the mutual coupling capacitor 23 formed between the drive electrode 20 and sense electrode 21. A current measurement device 24 is connected to the sense electrode 21 and provides a measurement of the size of the mutual coupling capacitor 23. When the input object 13 is brought to close proximity to both electrodes, it forms a first dynamic capacitor to the drive electrode 27 and a second dynamic capacitor to the sense electrode 28. If the input object is connected to ground, as is the case for example of a human finger connected to a human body, the effect of these dynamically formed capacitances is manifested as a reduction of the amount of capacitive coupling in between the drive and sense electrodes, and hence a reduction in the magnitude of the signal measured by the current measurement device 24 attached to the sense electrode 21.

As described, for example, in U.S. Pat. No. 5,841,078 (Bisset et al, issued Oct. 30, 1996), by arranging a plurality of drive and sense electrodes in a grid pattern to form an electrode array, this projected capacitance sensing method may be used to form a touch panel device. An advantage of the projected capacitance sensing method over the surface capacitance method is that multiple simultaneous touch input events may be detected.

Devices have been disclosed in which the touch panel can switch between self-capacitive and projected or mutual capacitive modes by means of switches. For example, US 2014/0078096 (Tan et al., published Mar. 20, 2014) applies a method to fixed touch panel patterns. The objective of this capability is to use either mode when it is more beneficial for object detection. Moreover, some devices allow the change of shape or size of the sense and drive electrodes, or their spatial arrangements. For example, U.S. Pat. No. 8,054,300 (Berstein, issued Nov. 8, 2011) proposes a method of reconfigurability by means of switches located on the side of the panel or in a separate board.

In many touchscreens the touch panel is a device independent of the display. The touch panel sits on top of the display, and the light generated by the display crosses the touch panel, with an amount of light being absorbed by the touch panel. In more recent implementations, for example U.S. Pat. No. 7,859,521 (Hotelling et al., issued Dec. 28, 2010), part of the touch panel is integrated within the display stack, and the touch panel and display may share the use of certain structures, such as transparent electrodes. This integration of the touch panel into the display structure seeks to reduce price by simplifying manufacture, as well as reducing the loss of light throughput that occurs when the touch panel is independent of the display and located on top of the display stack.

Another fully integrated touch panel is described in U.S. Pat. No. 8,390,582 (Hotelling et al., issued Mar. 5, 2013). The disclosed device uses additional signal lines and transistors to switch between display functionality and self-capacitance touch panel functionality, requiring at least three additional transistors per pixel. Display RGB data lines are connected to source/drain transistor terminals, and act as either voltage drive lines or charge sense lines, which prevents the concurrent driving of touch panel and display.

An enhanced integrated active matrix touch panel is disclosed in Applicant's commonly owned PCT publication number WO 2017/056500 (Gallardo et al., published Apr. 6, 2017), which is incorporated here by reference. As an integrated touch panel, the device is operable in either one of a self-capacitance touch sensing mode or a mutual capacitance touch sensing mode. The device includes both a display and a touch panel, and so is operable both as display and as a touch panel (although not necessarily simultaneously). The device is integrated in the sense that at least some components are common to both the touch panel and the display.

As described in WO 2017/056500, an active matrix touch panel (AMTP) is an in-cell technology by which all the components of the touch panel are integrated into the same substrate as the display circuitry, with which the touch panel shares space. In-cell or integrated touch panels save cost to the display manufacturer. In-cell touch panels, however, pose new problems, as normally the available space is very limited. Frequently, some components have to be shared between the display and touch panel components. For AMTP, the touch panel and the displays share the top electrode, also referred to as the common electrode or VCOM.

FIG. 3 is a drawing depicting an overview of an exemplary pixel arrangement 30 in a typical display system. The pixel arrangement 30 may include individual pixels 32 that are grouped into touch panel (TP) elements 34 that permit the touch panel operations described above. In a typical display, each pixel has a top electrode, and the pixel top electrodes combine into a single, continuous top electrode corresponding to VCOM as referenced above. For AMTP, the VCOM is patterned into a two-dimension array of touch panel elements 34. Each touch panel element covers a number of pixels, and the top electrode of these pixels is a component of the respective touch panel element. In this manner, therefore, the display and touch panel share the VCOM electrode.

FIG. 4 is a drawing depicting an exemplary AMTP structure comparably as taught in WO 2017/056500. In such configuration, a basic unit cell 36 includes a plurality of the individual pixels 32 arranged in an array. In this example, a basic unit cell 36 includes a 3×2 pixel array. The touch panel element 34 in turn includes an array of unit cells 36 arranged in parallel. A typical example may incorporate 100 unit cells 36 within a touch panel element 34, resulting in 600 individual pixels per touch panel element.

FIG. 5 is a drawing depicting an exemplary array 38 of touch panel elements 34, as may be incorporated into a touch panel display system. An exemplary electrical interconnection of the touch panel elements is shown in this figure. Each touch panel element can be connected either to a sense line (SEN) or to a function line (FNC). These connections are made by two thin film transistors (TFTs), denoted M1 and M2. Gate select lines SEL and SELB are operable to switch M1 versus M2 open or closed, thereby controlling whether the touch panel is electrically connected to SEN (via operation of the SEL gate line) or to FNC (via operation of the SELB gate line). The SEN lines connect to the sensing circuitry of a touch panel controller (TPC), so that touch signals can be read and measured. The FNC lines can either supply a driving signal from a display driver, or can be connected to ground for performing different functions of the pixels.

FIG. 6 is a drawing depicting an exemplary configuration of a unit cell 36, including electrical interconnections comparably as depicted in FIG. 5. The unit cell 36 employs the 3×2 pixel configuration referenced above, with FIG. 6 further illustrating the color sub-pixels red, blue, and green for each individual pixel 32 along with the respective interconnection lines. RGB TFTs are connected to a display gate line for control of light emission from the various sub-pixels via the RGB TFTs associate with the color sub-pixels. The M1 and M2 TFTs for this unit cell also are shown, as connected to the select, sense, and function lines as referenced above with respect to FIG. 5. The available space for touch panel TFTs and connection lines is very limited, because most of the display area needs to be dedicated to the optical aperture for letting light through from the light source at the non-viewing side of the display system. The available space is fragmented, and typically is configured of small spaces at the side of the RGB TFTs. A single TFT potentially could be used to switch each pixel, but such a configuration would be too resistive for a touch panel element. Accordingly, to form the touch panel element multiple unit cells are connected in parallel, with, as referenced above, the basic AMTP unit cell including six pixels arranged in an array of three rows by two columns. The basic unit cell configuration can be modified, for example to include additional TFTs for added functionalities. WO 2017/056500 describes several embodiments with modified unit cells, allowing different drive and sense schemes.

A deficiency of conventional systems that employ arrays of electrodes, such as for example conventional touch panels, is that the control signal connections such as driving or sensing are selectable generally upon only a row or a column basis. Individual electrode elements generally are not individually selectable for control, and thus there are limitations on electrode control patterns which in turn may limit usage of conventional systems.

SUMMARY OF INVENTION

The present disclosure describes enhancements to the configuration of an electronic device that employs an array of electrodes, such as an active matrix touch panel (AMTP) including for example the AMTP configuration described in WO 2017/056500. A matrix or array of electrodes is described in which individual electrode elements can be selectively connected to and disconnected from control signal lines. In exemplary embodiments, individual electrode elements can be selectively connected to and disconnected from either one of, both, or neither one of a pair of control signal lines. In other exemplary embodiments, individual electrode elements may be connected to and disconnected from a single function line. Accordingly, electrode control patterns may be achieved other than row-wise or column-wise as is conventional.

Individual electrode elements are programmed to a given control signal line connection or connections in a generally stable manner. In other words, a given electrode element will maintain the connection to the programmed control signal line(s) until the programming is switched. A refresh operation may be performed to ensure the stability of a given control line connection, with the refresh cycle being determined experimentally as may be suitable for any particular configuration or application. An enhanced unit cell of the electrode array configuration includes integrated programming circuitry that programs the electrode element of the unit cell in-situ, i.e., the programming circuitry is integrated into the unit cell itself. This integrated programming circuitry provides for stable programming that may be enhanced by the referenced refresh operation, and such additional components for the integrated programming circuitry may be incorporated into the unit cell circuitry without having to add any additional signal control lines.

An aspect of the invention, therefore, is an enhanced electrode array device having integrated programming circuitry within the unit cells for stable connection of individual electrode elements of the unit cells to one or more control signal lines. In exemplary embodiments, an array of unit cells are arranged in a two-dimensional array of rows and columns. Each unit cell includes an individual electrode element that is electrically connectable to at least one function line; and programming circuitry that is integrated into the unit cell and is operable to place the unit cell in a plurality of connection states corresponding to different states of electrical connection or disconnection to the at least one function line. The unit cells are individually selectable for programming and operation in one of the plurality of connection states.

In exemplary embodiments, the programming circuitry includes a first storage element (capacitor); a first electronic switch (TFT) that is connected between a first function line and the first storage element; and a second electronic switch (TFT) connected between the first storage element and the individual electrode element. During a first programming mode the first electronic switch is in an on state and a current flow from the first function line through the first electronic switch charges the first storage element. The charge on the first storage element maintains the second electronic switch in an on state, whereby the unit cell is in a first connection state in which the individual electrode element is connected to the first function line. The programming circuitry further may include a second storage element (capacitor); a third electronic switch (TFT) that is connected between a second function line and the second storage element; and a fourth electronic switch (TFT) connected between the second storage element and the individual electrode element. During a second programming mode the third electronic switch is in an on state and a current flow from the second function line through the third electronic switch charges the second storage element. The charge on the second storage element maintains the fourth electronic switch in an on state, whereby the unit cell is in a second connection state in which the individual electrode element is connected to the second function line. A gate of the first electronic switch is connected to a first select line for programming the unit cell for the first connection state, and a gate of the third electronic switch is connected to a second select line for programming the unit cell for the second connection state.

Another aspect of the invention is a method of operating an electrode array device having integrated programming circuitry within the unit cells for stable connection of individual electrode elements of the unit cells to one or more control signal lines. In exemplary embodiments, the method includes the steps of: providing an electrode array device according to any of the embodiments; electronically selecting one or more unit cells, and for the selected unit cells performing the steps of: operating the selected unit cells in a first programming mode in which the programming circuitry of the selected unit cells is charged via electrical connection to a first function line; electrically disconnecting the programming circuitry of the selected unit cells from the first function line; and operating the charged unit cells in a first connection state in which the charge of the programming circuitry maintains an electrical connection between individual electrode elements of the charged unit cells and the first function line. The method further may include electronically selecting another one or more unit cells, and for the selected unit cells performing the steps of: operating the selected unit cells in a second programming mode in which the programming circuitry of the selected unit cells is charged via electrical connection to a second function line; electrically disconnecting the programming circuitry of the selected unit cells from the second function line; and operating the charged unit cells in a second connection state in which the charge of the programming circuitry maintains an electrical connection between individual electrode elements of the charged unit cells and the second function line. The unit cells may be discharged and re-programmed to operate in different connection states, and a refresh operation may be performed to enhance stability of the charge of the programming circuitry.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Figure 1:
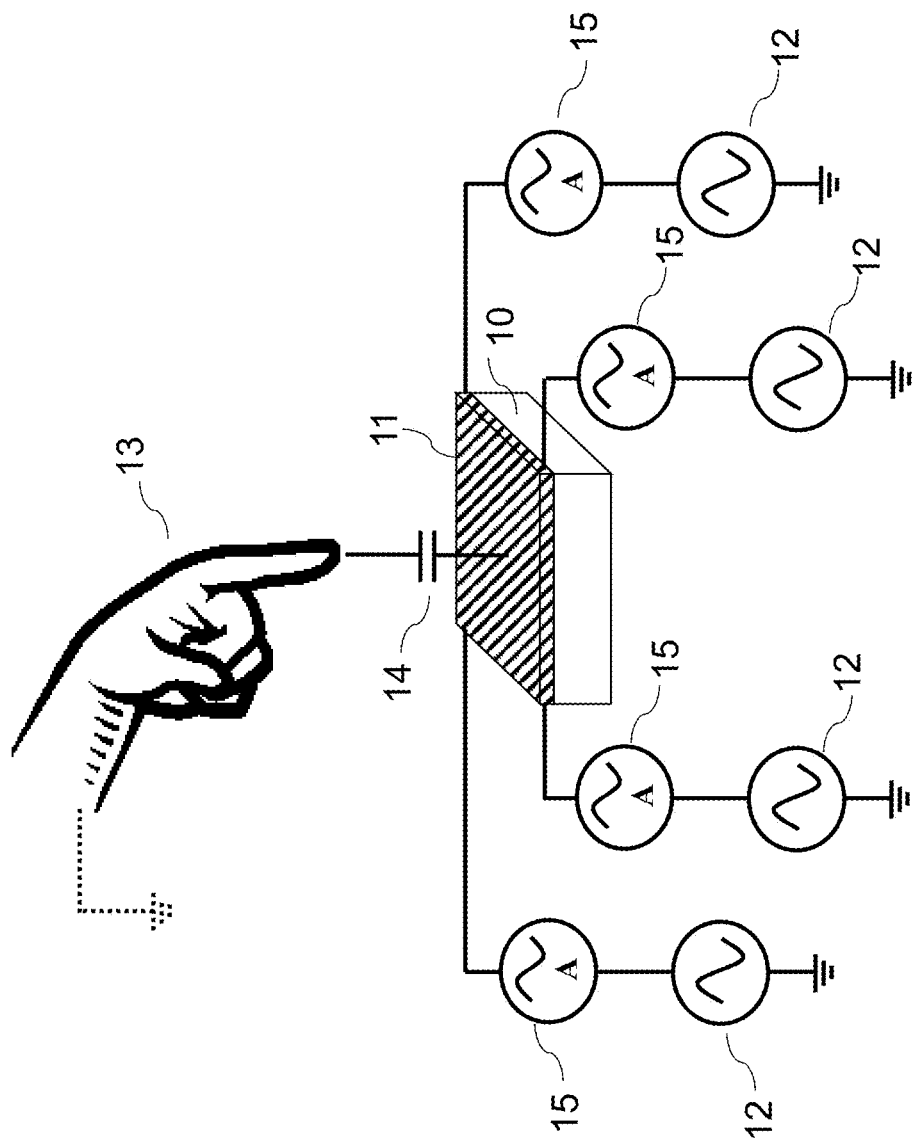
FIG. 1 is a drawing depicting a conventional implementation of a surface capacitance type touch panel.
Figure 2:
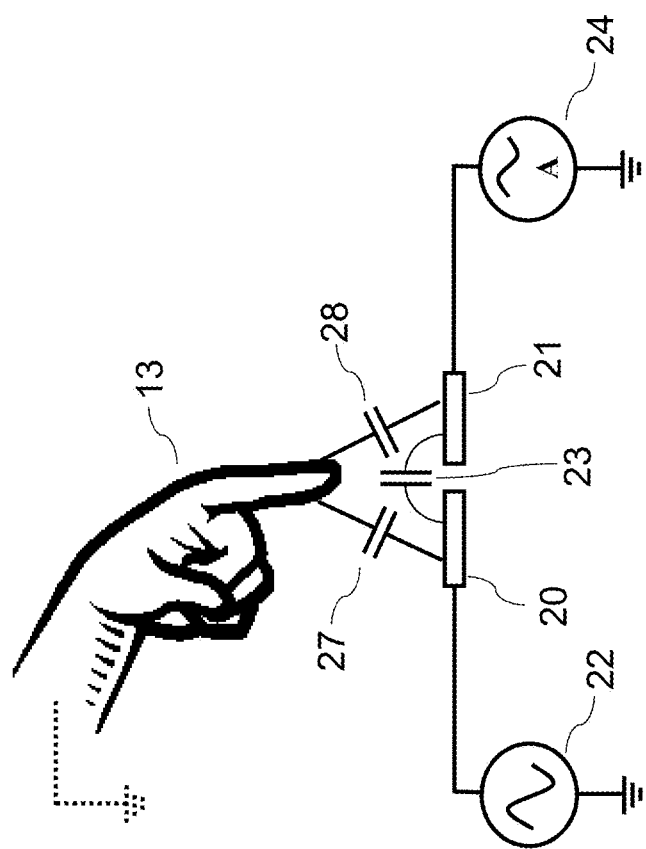
FIG. 2 is a drawing depicting a conventional implementation of a mutual capacitance type touch panel.

Embodiments of the present invention will now be described with reference to the drawings, wherein like reference numerals are used to refer to like elements throughout. It will be understood that the figures are not necessarily to scale.

As referenced above, the present invention is described largely in connection with an exemplary usage in touch panels. It will be appreciated that principles of this invention are applicable to other fields employing electrode arrays, being more broadly applicable to networks of switchable sensing and/or driving electrodes, such as for example display devices generally, sensors, and radio frequency (RF) antennae arrays.

Given the significant application to touch panels as a principal example, the present disclosure describes enhancements to the configuration of an electronic device that employs an array of electrodes, such as an active matrix touch panel (AMTP) including for example the AMTP configuration described in WO 2017/056500. A matrix or array of electrodes is described in which individual electrode elements can be selectively connected to and disconnected from control signal lines. In exemplary embodiments, individual electrode elements can be selectively connected to and disconnected from either one of, both, or neither one of a pair of control signal lines. In other exemplary embodiments, individual electrode elements may be connected to and disconnected from a single function line. Accordingly, electrode control patterns may be achieved other than row-wise or column-wise as is conventional.

Figure 7:
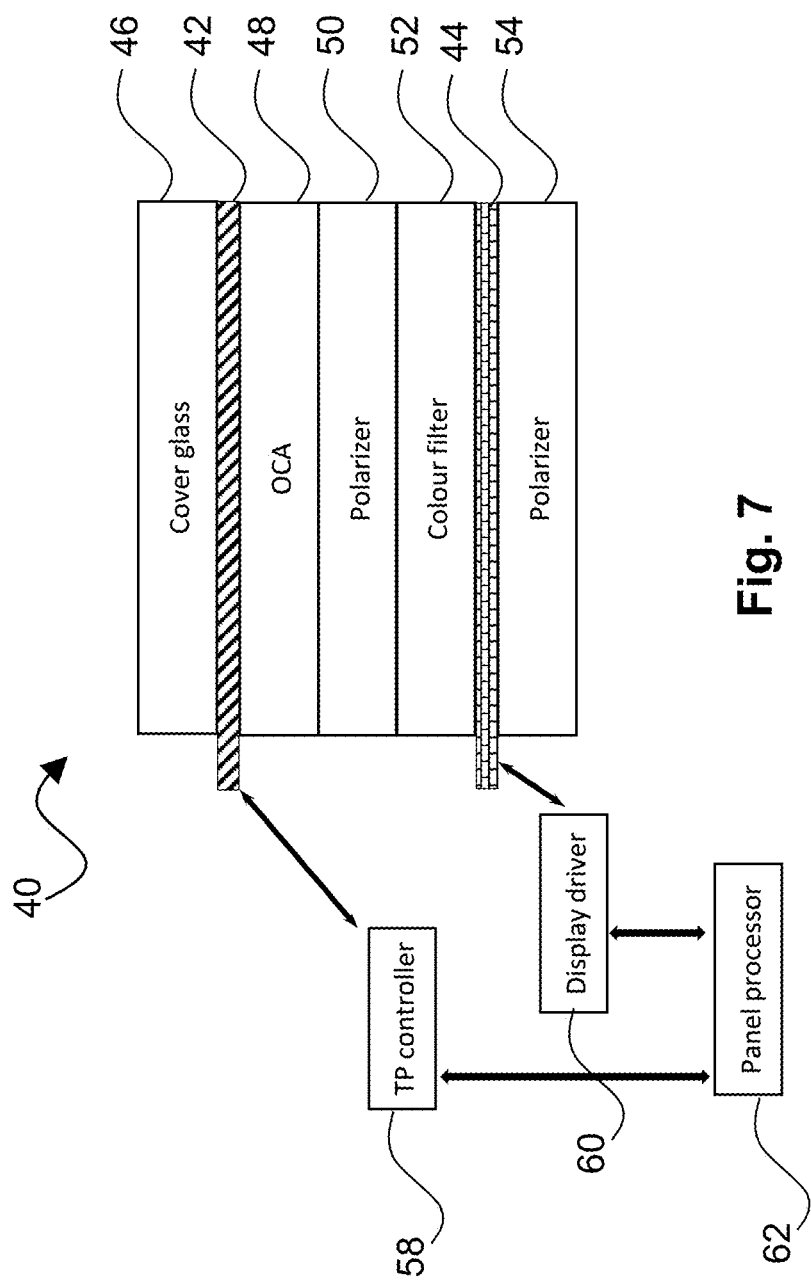
FIG. 7 is a drawing depicting a sectional view of an exemplary LCD touch screen device.

Embodiments of the present disclosure may be configured as an active matrix touch panel (AMTP) that may be used, for example, in touch panel display systems or the like. FIG. 7 is a drawing depicting a sectional view of an exemplary LCD touch screen 40, i.e. a combination of a touch panel 42 and an LCD display 44. In the configuration of FIG. 7, the touch panel 42 and display 44 are physically separated, and typically the touch panel 42 may be located below a cover glass 46. Additional layer components may be incorporated into the display system stack, although the order, arrangement, and types of the layers may be different. For example, the components may include an optically clear adhesive (OCA) layer 48 that adheres the touch panel 42 to a front polarizer 50. The components further may include a color filter 52 on a viewing side of the display 44 to enhance color control, and a rear polarizer 54 on a non-viewing side of the display 44 relative to the front polarizer 50. A touch panel controller 58 generates control signals for operation of the touch panel functionality and reads sense signals generated by the touch panel during a sense mode. A display driver 60 generates control signals for function modes including various display functionalities. The touch panel controller 58 and display driver 60 both may be controlled and coordinated in turn by a main panel processor 62.

Figure 8:
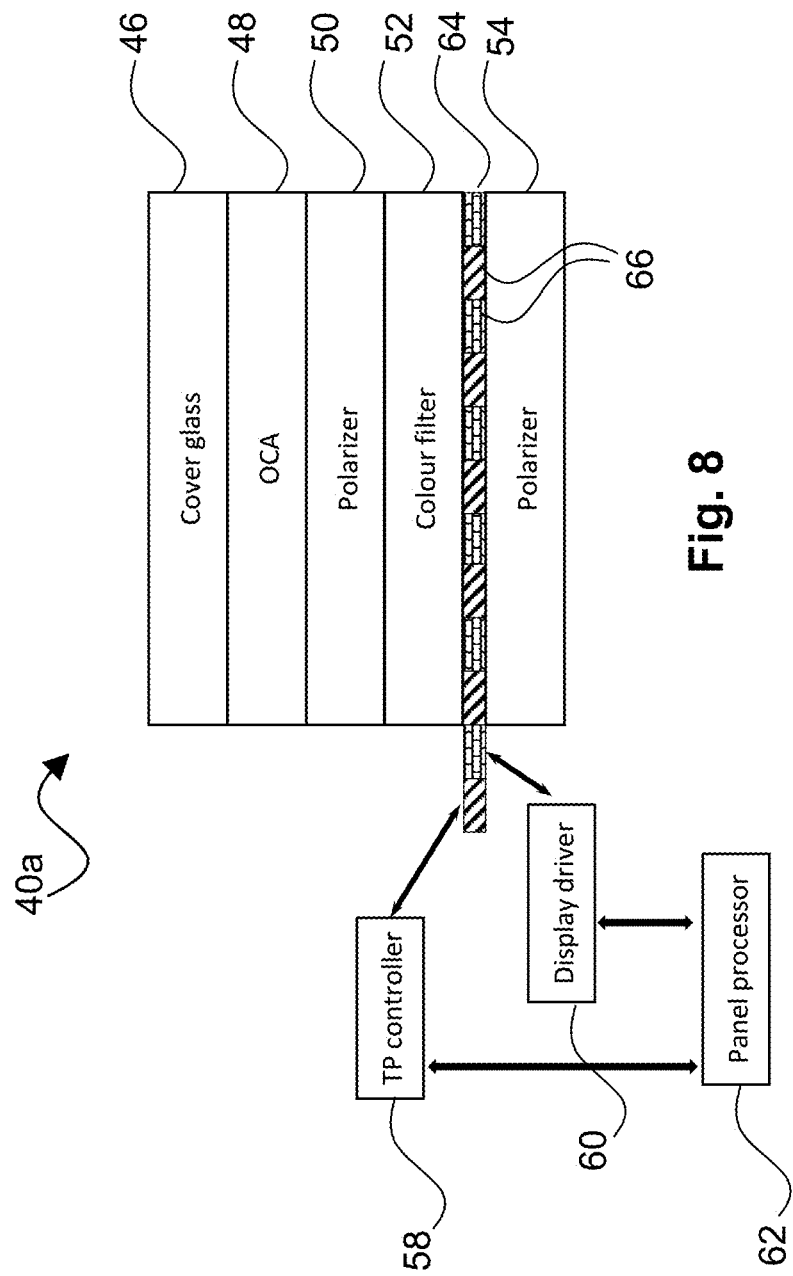
FIG. 8 is a drawing depicting a sectional view of an exemplary LCD touch screen device having an integrated touch and display layer.

Preferably for the in-situ programming performed in the present invention, as shown in the configuration of a display system 40a of FIG. 8, the display and touch sensor functionality may be integrated into a common layer 64 within the display system. This configuration is referred to an in-cell configuration in that all the components of the touch panel are integrated into the same substrate as the display circuitry, with which the touch panel shares space. The common display and touch sensor layer 64 may include individual elements 66 that are controllable by either the touch panel controller 58 or display driver 60 as desired for a given control function, including different function and sense modes.

A pixel arrangement for an integrated display and touch sensor may be comparable as described above with respect to FIG. 3. Referring again to FIG. 3, the pixel arrangement 30 may include individual pixels 32 that are grouped into touch panel elements 34 that permit the touch panel and display operations. In a typical display, each pixel has a top electrode, and the pixel top electrodes combine into a single, continuous top electrode referred to as VCOM. For AMTP, the VCOM is patterned into a two-dimension array of touch panel elements 34. Each touch panel element covers a number of pixels, and the top electrode of these pixels is a component of the respective touch panel element. In this manner, therefore, the display and touch panel share the VCOM electrode.

Figures 3, 4:
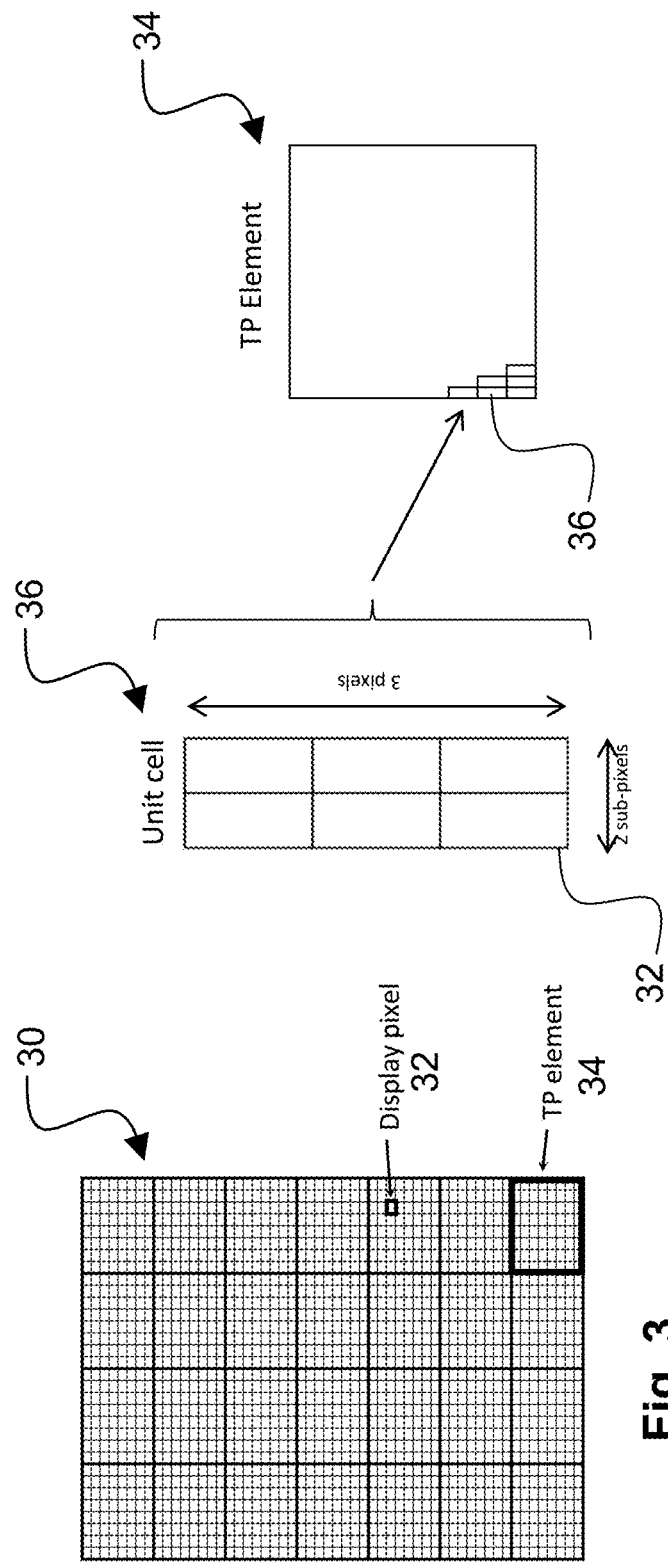
FIG. 3 is a drawing depicting an overview of an exemplary pixel arrangement in a typical display system.
FIG. 4 is a drawing depicting an exemplary active matrix touch panel configuration comparably as taught in WO 2017/056500.

The integrated display and touch sensor further may include an exemplary AMTP structure comparably as described above with respect to FIG. 4. Referring again to FIG. 4, in such configuration a basic unit cell 36 includes a plurality of the individual pixels 32 arranged in an array. In the example of FIG. 4, a basic unit cell 36 may include a 3×2 pixel array. The touch panel element 34 in turn includes an array of unit cells 36 arranged in parallel. A typical example may incorporate 100 unit cells 36 within a touch panel element 34, resulting in 600 individual pixels per touch panel element.

Different sized unit cells may be advantageous with incorporation of the referenced programming circuitry of the present invention, and thus a unit cell need not be a 3×2 pixel array and pixel array size may be employed. In addition, the described unit cell arrangements are not limited to touch panels, and comparable unit cell arrangements may be employed for any electrode array device, including for example as referenced above display devices generally, sensors, radio frequency (RF) antennae arrays, and similar electrode array devices.

Figure 9:
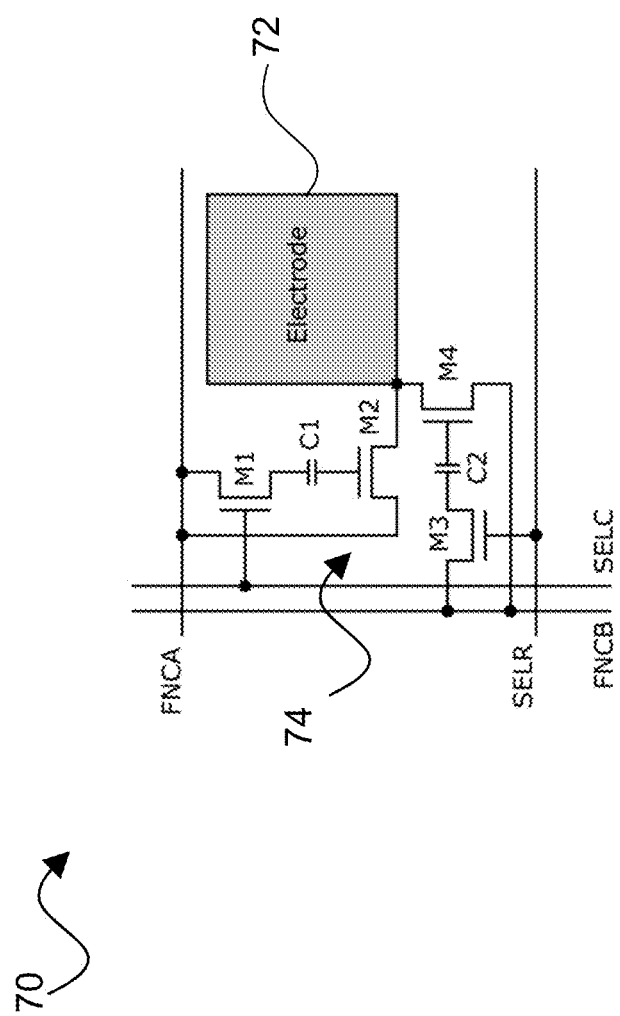
FIG. 9 is a drawing depicting control circuitry for a unit cell of an electrode array device, including integrated programming circuitry in accordance with embodiments of the present invention.

FIG. 9 is a drawing depicting control circuitry for an exemplary unit cell 70, including integrated programming circuitry in accordance with embodiments of the present invention. Such configuration shares some elements with the AMTP elements described in WO 2017/056500. The unit cell 70 includes an individual electrode element 72 and control circuitry 74 that can electrically connect the electrode element to one or more of a plurality of signal lines. In this example, there are a pair of function lines to which the electrode element may be connected, denoted in FIG. 9 as a first function line FNCA and a second function line FNCB. It is desirable that the connection to one or both of the function lines generally be stable, i.e., the unit cell is programmed for a first connection state to a given function line(s) and remains programmed with the first connection state until re-programmed to second connection state to a given function line(s). A refresh operation may be performed to ensure the stability of a given connection state (e.g., to maintain stability of the first connection state or the second connection state), with a refresh cycle being determined experimentally as may be suitable for any particular configuration or application.

The unit cell connections to the signal lines initially are made by electronic switches, which in exemplary embodiments are configured within the unit cell circuitry 74 as two thin film transistors (TFTs), denoted first transistor M1 and third transistor M3 in FIG. 9. The unit cell further includes additional electronic switches that are connected to the electrode element 72, which in exemplary embodiments are configured as two additional thin film transistors (TFTs), denoted second transistor M2 and fourth transistor M4 in FIG. 9. In this example, the TFTs M1-M4 all are n-type digital switch TFTs that are rendered in an on state by application of a high gate voltage (digital "1" state) and in an off state by a low or zero gate voltage (digital "0" state). The unit cell circuitry further may include first and second capacitors C1 and C2 that enable programming of the unit cell as further detailed below.

An aspect of the invention, therefore, is an enhanced electrode array device having integrated programming circuitry within the unit cells for stable connection of individual electrode elements of the unit cells to one or more control signal lines. In exemplary embodiments, an array of unit cells are arranged in a two-dimensional array of rows and columns. Each unit cell includes an individual electrode element that is electrically connectable to at least one function line; and programming circuitry that is integrated into the unit cell and is operable to place the unit cell in a plurality of connection states corresponding to different states of electrical connection or disconnection to the at least one function line. The unit cells are individually selectable for programming and operation in one of the plurality of connection states.

Referring to FIG. 9, in exemplary embodiments the circuit connections for the unit cell 70 are configured as follows as an example. M1 is connected between the first function line FNCA and a first plate of capacitor C1, with the gate of M1 connected to a first select line SELC. M2 is connected between the first function line FNCA and the electrode element 72, with the gate of M2 connected to the second plate of capacitor C1. M3 is connected between the second function line FNCB and a first plate of capacitor C2, with the gate of M3 connected to a second select line SELR. M4 is connected between the second function line FNCB and the electrode element 72, with the gate of M4 connected to the second plate of capacitor C2.

First and second select lines SELC and SELR select which columns ("C") and rows ("R") are to be programmed. The first select line SELC and second select line SELR are operable respectively to switch M1 and/or M3 open or closed, thereby controlling whether the unit cell 70 is electrically connected to the first function line FNCA (via operation of the SELC gate line) or to the second function line FNCB (via operation of the SELR gate line). In this example configuration, the select lines SELC and SELR are perpendicular to each other, and the first function line FNCA is perpendicular to the first select line SELC and the second function line FNCB is perpendicular to the second select line SELR.

The control circuitry 74 of the unit cell 70 includes integrated programming circuitry, including the switch TFTs M1 and M3 that are operable to charge capacitors C1 and C2 respectively. Essentially, as components of the integrated programming circuitry, capacitors C1 and C2 operate as memory elements that store charge to maintain electrical connections to respective function lines FNCA and FNCB through transistors M2 and M4, respectively.

Another aspect of the invention, therefore, is a method of operating an electrode array device having integrated programming circuitry within the unit cells for stable connection of individual electrode elements of the unit cells to one or more control signal lines. In exemplary embodiments, the method includes the steps of: providing an electrode array device according to any of the embodiments; electronically selecting one or more unit cells, and for the selected unit cells performing the steps of: operating the selected unit cells in a first programming mode in which the programming circuitry of the selected unit cells is charged via electrical connection to a first function line; electrically disconnecting the programming circuitry of the selected unit cells from the first function line; and operating the charged unit cells in a first connection state in which the charge of the programming circuitry maintains an electrical connection between individual electrode elements of the charged unit cells and the first function line. The method further may include electronically selecting another one or more unit cells, and for the selected unit cells performing the steps of: operating the selected unit cells in a second programming mode in which the programming circuitry of the selected unit cells is charged via electrical connection to a second function line; electrically disconnecting the programming circuitry of the selected unit cells from the second function line; and operating the charged unit cells in a second connection state in which the charge of the programming circuitry maintains an electrical connection between individual electrode elements of the charged unit cells and the second function line. The unit cells may be discharged and re-programmed to operate in different connection states, and a refresh operation may be performed to enhance stability of the charge of the programming circuitry.

The following describes programming and operation as to one of the unit cells in an electrode array device. Such functioning may be expanded to an array of unit cells to perform the method steps as further detailed below. FIG. 10A and FIG. 10B are drawings depicting an exemplary programming and operation of the unit cell 70 of FIG. 9 for a first connection state. In this example of the first connection state, the unit cell 70 is operated to program and connect the individual electrode element 72 to the first function line FNCA. The bolded line portions indicate the presence of control signal "on" states and resulting current flow, and the non-bolded line portions indicate control "off" states and the absence of any current flow.

As illustrated in FIG. 10A, to electrically connect the unit cell to FNCA, the first select line SELC is taken high which places the first transistor M1 in an on state. The first function line FNCA is set to high as corresponding to a desired first function, and with M1 on, current flow from the FNCA line through M1 charges the first capacitor C1. The charging of C1 constitutes the programming mode of the unit cell for electrical connection to the first function line FNCA. As illustrated in FIG. 10B, once C1 is charged the unit cell may be placed in an operation mode. The first select line SELC is taken low, which turns off M1 thereby disconnecting the programming circuitry from the FNCA line. The charge on C1 built up during the programming mode now operates to maintain the second transistor M2 in an on state, which electrically connects the first function line FNCA to the electrode element 72. The electrode element therefore will perform in accordance with the control signal supplied from the FNCA line.

Comparable programming and operation modes may be performed in relation to connection to the second function line FNCB. Accordingly, FIG. 11A and FIG. 11B are drawings depicting an exemplary programming and operation of the unit cell 70 of FIG. 9 for a second connection state. In this example of the second connection state, the unit cell 70 is operated to program and connect the individual electrode element 72 to the second function line FNCB. Again, the bolded line portions indicate the presence of control signal "on" states and resulting current flow, and the non-bolded line portions indicate control "off" states and the absence of any current flow.

As illustrated in FIG. 11A, to electrically connect the unit cell to FNCB, the second select line SELR is taken high which places the third transistor M3 in an on state. The second function line FNCB is set to high as corresponding to a desired second function, and with M3 on, current flow from the FNCB line through M3 charges the second capacitor C2. The charging of C2 constitutes the programming mode of the unit cell for electrical connection to the second function line FNCB. As illustrated in FIG. 11B, once C2 is charged the unit cell may be placed in an operation mode. The second select line SELR is taken low, which turns off M3 thereby disconnecting the programming circuitry from the FNCB line. The charge on C2 built up during the programming mode now operates to maintain the fourth transistor M4 in an on state, which electrically connects the second function line FNCB to the electrode element 72. The electrode element will perform in accordance with the control signal supplied from the FNCB line.

Figure 10:
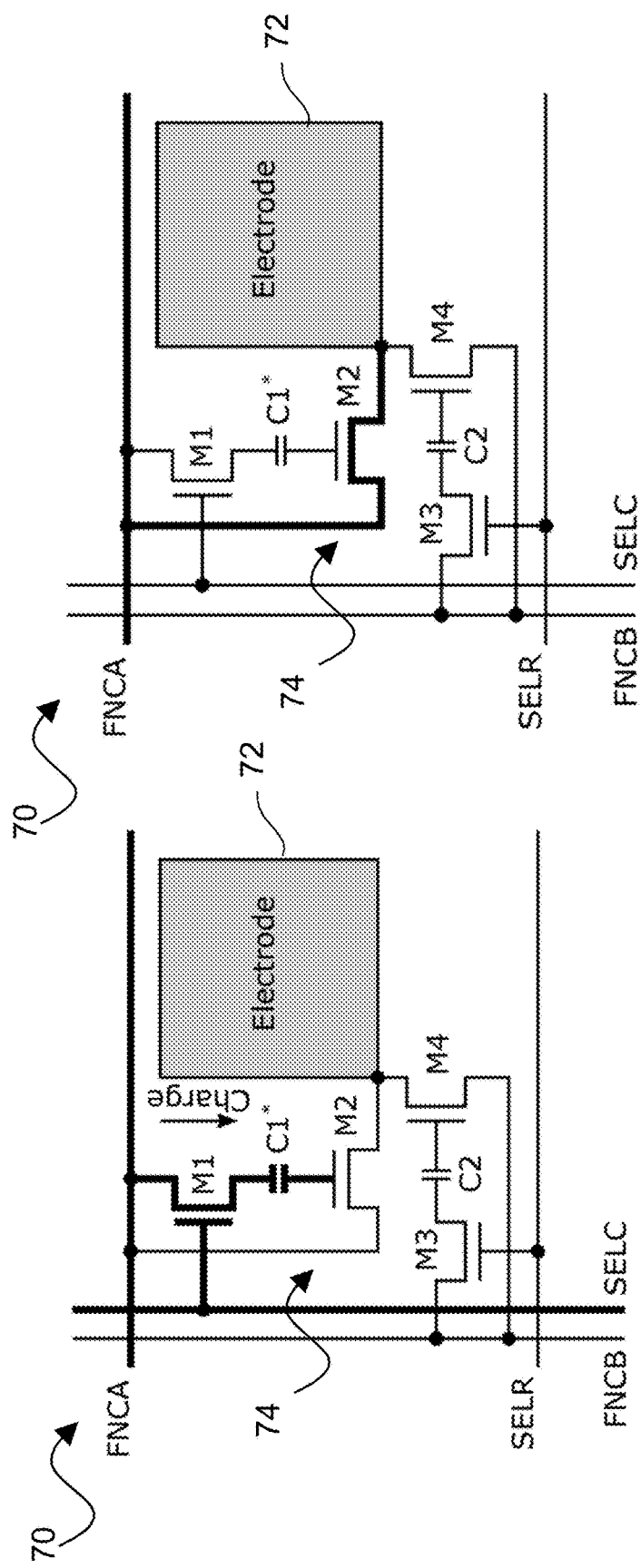
FIG. 10A and FIG. 10B are drawings depicting an exemplary programming and operation of the unit cell of FIG. 9 for a first connection state.
Figure 11:
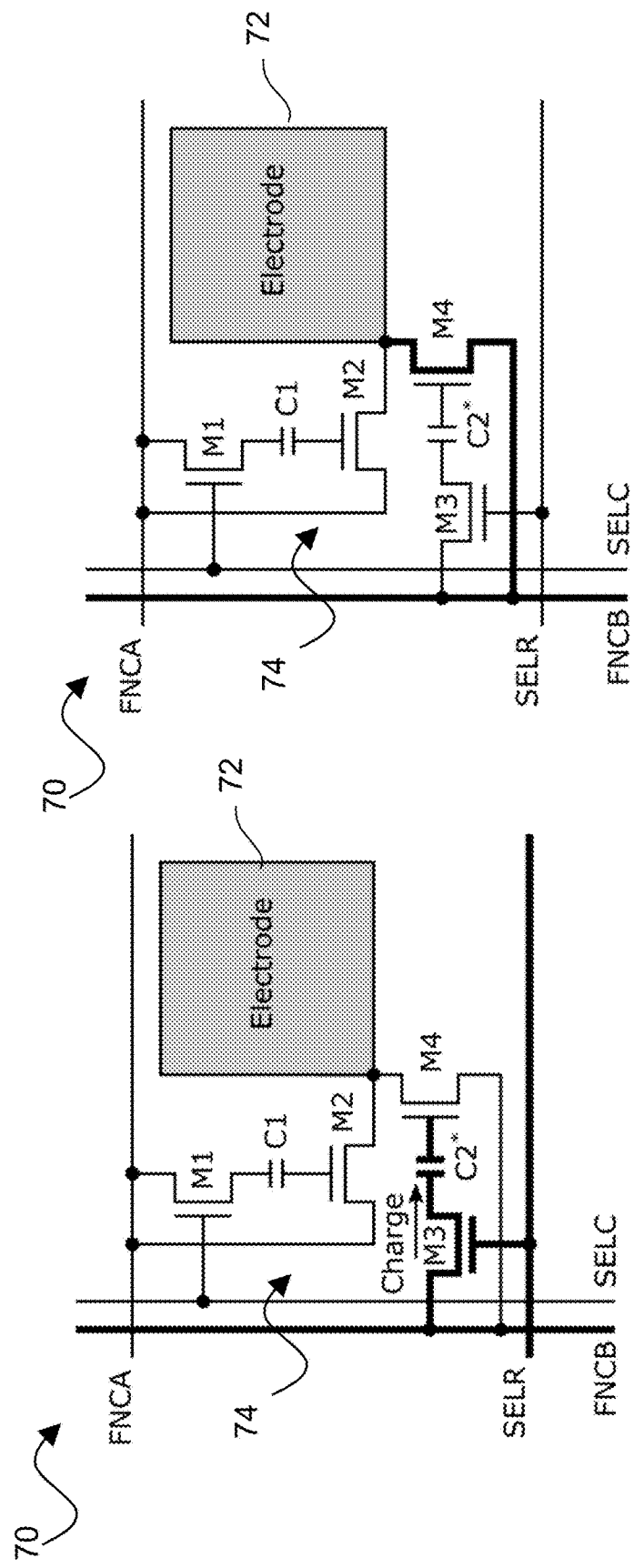
FIG. 11A and FIG. 11B are drawings depicting an exemplary programming and operation of the unit cell of FIG. 9 for a second connection state.

In the examples of FIGS. 10 and 11, each program state corresponds to an electrical connection of the electrode element to one of either the first function line FNCA or the second function line FNCB. In exemplary embodiments, the operations of FIGS. 10 and 11 may be combined into a connection state in which the electrode element 72 is connected to both function lines FNCA and FNCB, which may be desirable for certain applications. Alternatively, the external device controller may ignore control commands that could result in such a dual connection state, in which case the unit cell would be limited to either the connection state to FNCA or the connection state to FNCB, and to a "not-connected" NC state in which the unit cell is electrically disconnected from both function lines.

A given programmed connection state is stable in the sense that the connection state will be maintained so long as the associated capacitor maintains or preserves the programmed charge. In an ideal programmed condition, there being no pathway for discharge in the operation mode, the connection can be considered "permanent" in that the programmed connection state will be maintained until a re-programming operation is performed to a different connection state. In practice, however, the capacitor charge may leak with time. Accordingly, a refresh operation may be performed by repeating the operations described above to effectively "re-program" the unit cell to the same connection state. Performing such a refresh operation may be performed to ensure the stability of a given connection state, with a refresh cycle being determined experimentally as may be suitable for any particular configuration or application.

A re-programming operation to a different connection state may be performed as follows. A first step in re-programming is to discharge a given charged capacitor. In particular, to discharge the first capacitor C1, the first select line SELC is taken high to place the first transistor M1 in the on state. The first function line FNCA is then set to ground, which results in the first capacitor C1 discharging through M1 to the FNCA line. As capacitor C1 discharges, the second transistor M2 is turned off as the potential at the gate of M2 falls below the threshold voltage. Similarly, to discharge the second capacitor C2, the second select line SELR is taken high to place the third transistor M3 in the on state. The second function line FNCB is then set to ground, which results in the second capacitor C2 discharging through M3 to the FNCB line. As capacitor C2 discharges, the fourth transistor M4 is turned off as the potential at the gate of M4 falls below the threshold voltage. When the unit cell is in a state in which both capacitors are discharged, the unit cell is referred to as being in a "not-connected state" (NC), in which the unit cell is electrically disconnected from both function lines FNCA and FNCB. Once the discharging step is performed, the unit cell 70 may be re-programmed to a given connection state by performing the programming and operation modes described in connection with FIGS. 10 and/or 11 depending upon which re-programmed connection state is desired.

In the described examples, the TFTs M1-M4 are all n-type TFTs as referenced above. Such a configuration may be preferred for power efficiency, although the TFTs could be configured as p-type transistors with the control signal operations adjusted as warranted to achieve the sensing and display functionality described above.

Figure 5:
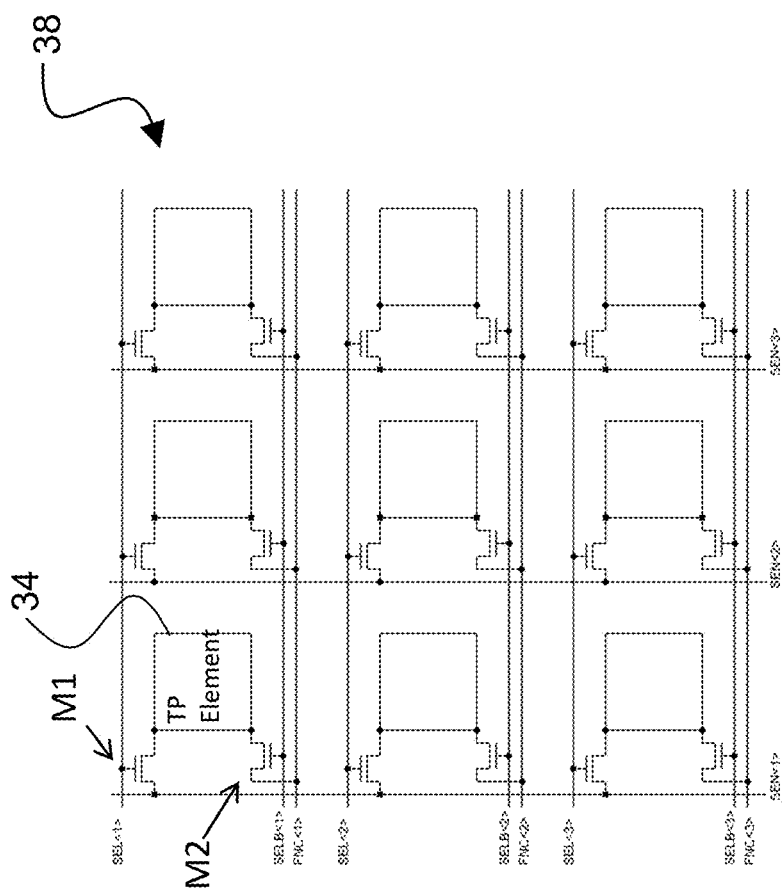
FIG. 5 is a drawing depicting an exemplary array of touch panel elements as may be incorporated into a touch panel display system.
Figure 6:
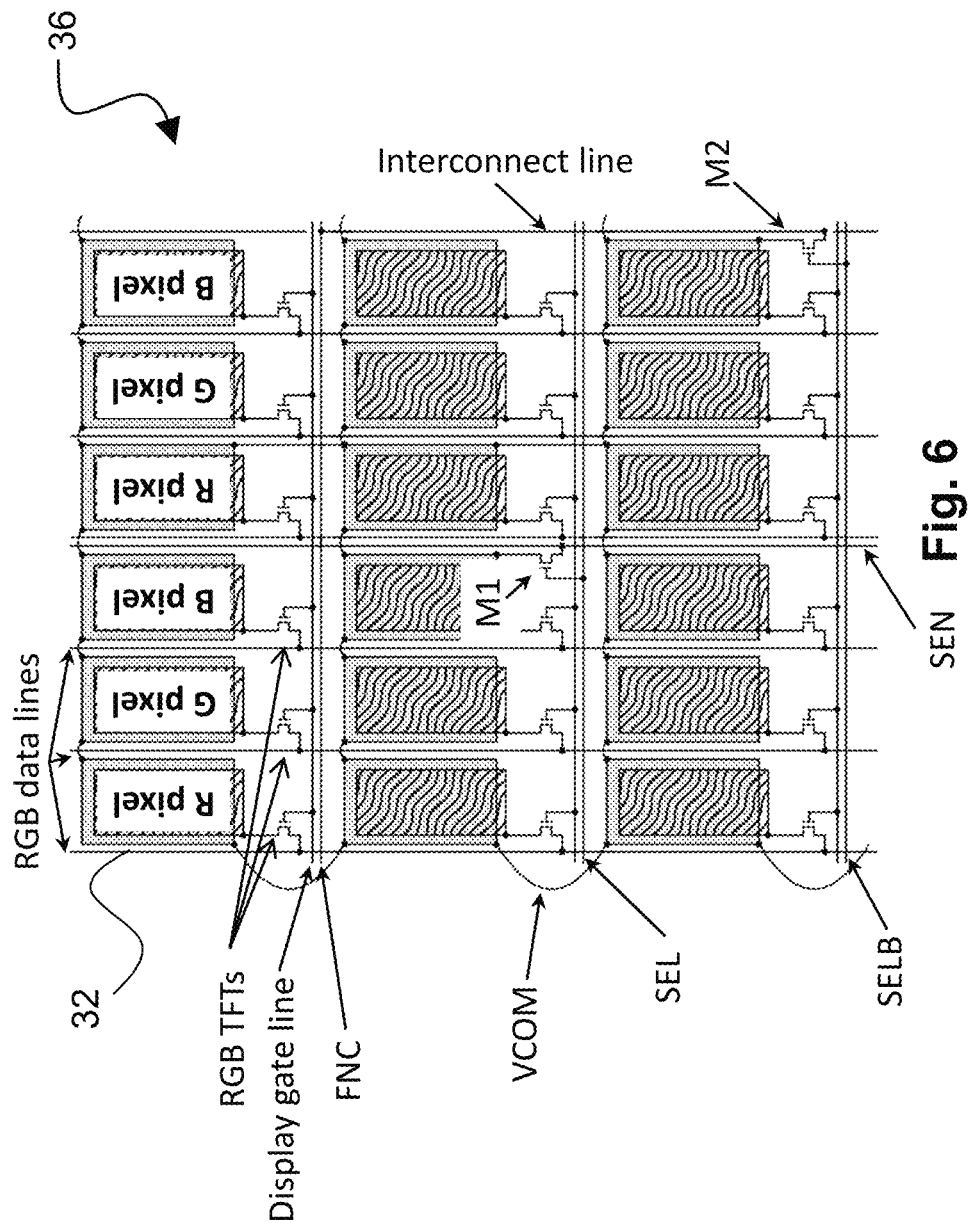
FIG. 6 is a drawing depicting an exemplary unit cell, including electrical interconnections comparably as depicted in FIG. 5.
Figure 12:
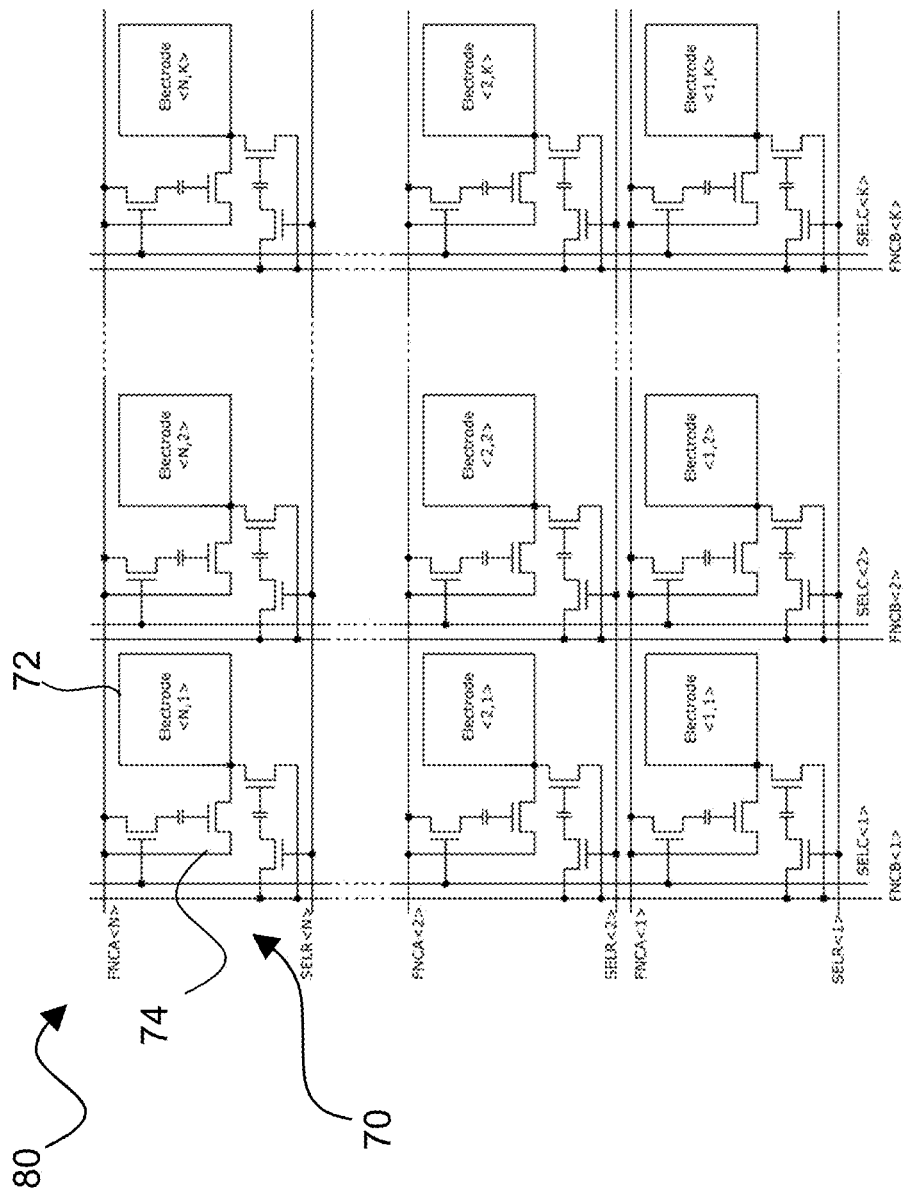
FIG. 12 is a drawing depicting an exemplary electrode array device including a two-dimensional array of unit cells of FIG. 9.

FIG. 12 is a drawing depicting an exemplary electrode array device 80 of unit cells 70, each unit cell again including an electrode element 72 and control circuitry 74 (circuit schematics comparably show the four switch transistors and two capacitors as in FIG. 9). For example, the electrode array device 80 may be a touch panel comparably as described with respect to FIG. 5, or electrode array device 80 may be some other electrode array device (e.g., RF antennae array or other array device). The electrode array device 80 is arranged in a two-dimensional array of unit cells of "N" rows by "K" columns. Any array size may be employed as suitable for any particular application. The control lines shown in FIG. 9 are shown as would be expanded for the array configuration of FIG. 12. With such expanded configuration for the array, in this example configuration the first and second select lines SELC(K) and SELR(N) are perpendicular to each other, and the first function lines FNCA(N) are perpendicular to the first select lines SELC(K) and the second function lines FNCB(K) are perpendicular to the second select lines SELR(N).

The programming and operation for the first function FNCA is as follows. First select lines SELC(K) are operated to select which Kth columns are to be programmed, and as to the selected Kth column(s), the individual electrode elements are programmed for the Nth row by taking the first function lines FNCA(N) high or low as corresponding to a desired electrode operation pattern. In other words, the same FNCA signal need not be applied to the individual electrode elements of all selected rows so as to permit individually controlling each electrode element. Similarly, the programming and operation for the second function FNCB is as follows. Second select lines SELR(N) are operated to select which Nth rows are to be programmed, and as to the selected Nth row(s), the individual electrode elements are programmed for the Kth column by taking the second function lines FNCB(K) high or low as corresponding to a desired electrode operation pattern. Accordingly, the same FNCB signal also need not be applied to the elements of all selected columns so as to permit individually controlling each individual electrode element.

Figure 13:
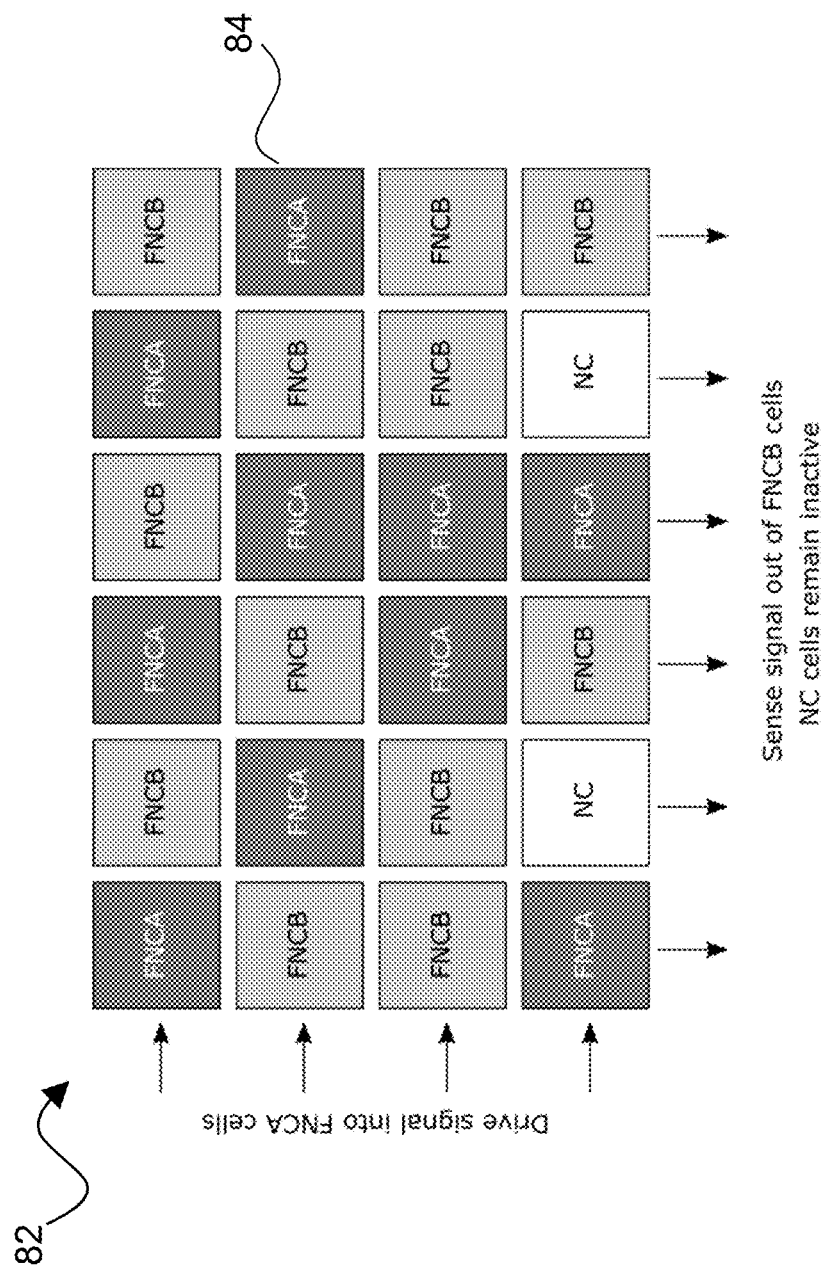
FIG. 13 is a drawing depicting an example electrode pattern of programming and operation of an exemplary electrode array.

FIG. 13 is a drawing depicting an example electrode pattern of programming and operation of an exemplary electrode array 82. In this example, the electrode array 82 is depicted as a 4×6 array of individual electrode elements 84, although again, any suitable electrode array size may be employed. The programming and operation of FIG. 13 may be employed, for example, for operation of a touch panel device in which a portion of the electrode elements are placed in a driving mode for display functions, and a portion of the electrode elements are placed in a sensing mode for sensing the presence of an object that manipulates the touch panel (e.g., finger or stylus). The different shading and labelling corresponds to different connection states of programming and operation for the individual electrode elements. In this example, for the electrode elements in driving mode, drive signals are provided via the FNCA function line to electrode elements programmed in a first connection state in which said electrode elements are electrically connected to FNCA. For electrode elements in the sensing mode, sense signals are read out via the FNCB function line to electrode elements programmed in the second connection state in which said electrode elements are electrically connected to FNCB. In this example, a portion of the electrode elements are in the not-connected (NC) state referenced above, as being electrically disconnected from both function lines FNCA and FNCB.

Figure 14:
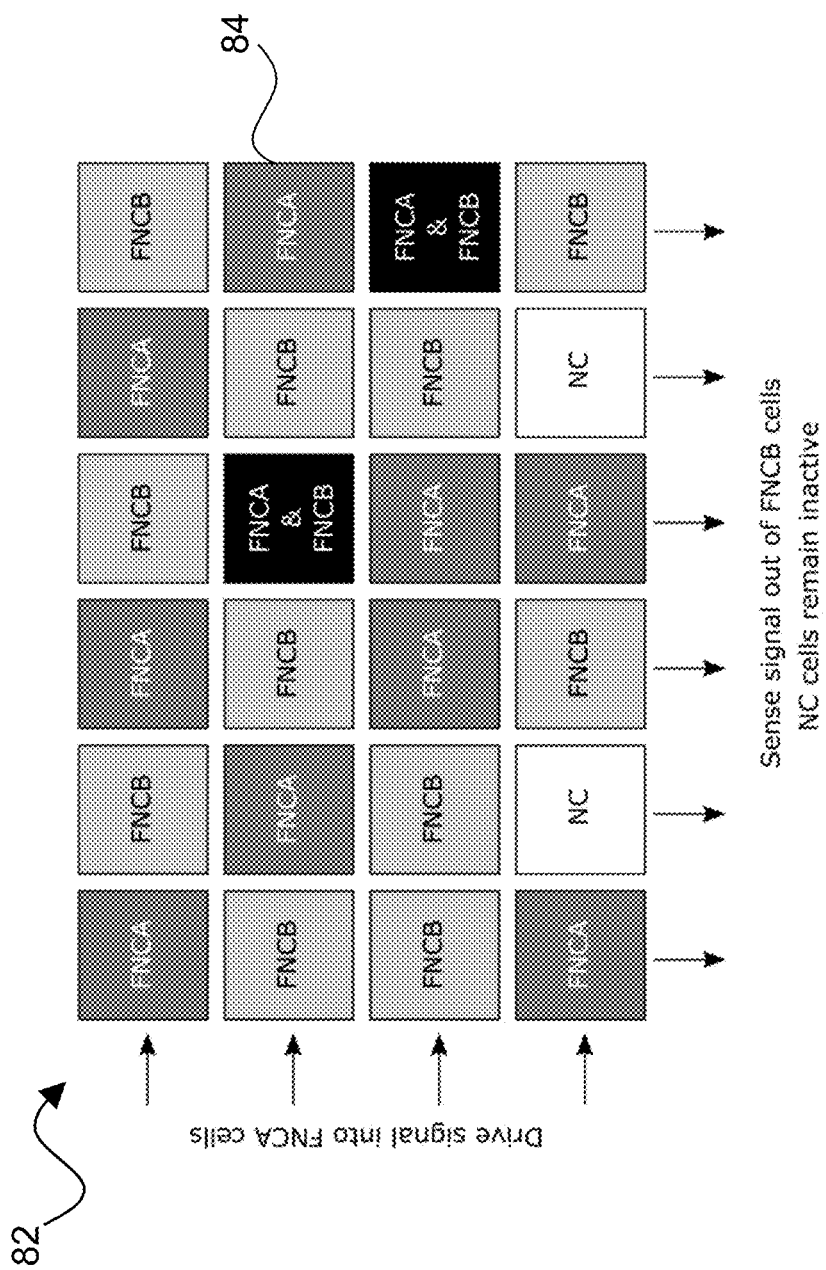
FIG. 14 is a drawing depicting another example electrode pattern of programming and operation of the exemplary electrode array of FIG. 13.

FIG. 14 is a drawing depicting another example of an electrode pattern of programming and operation of the exemplary electrode array of FIG. 13. The example of FIG. 14 is comparable to that of FIG. 13, with the addition that a portion of the electrode elements are in a dual connection state in which said electrode elements are electrically connected to both function lines FNCA and FNCB, so as to be essentially in a combined driving and sensing mode.

Figure 15:
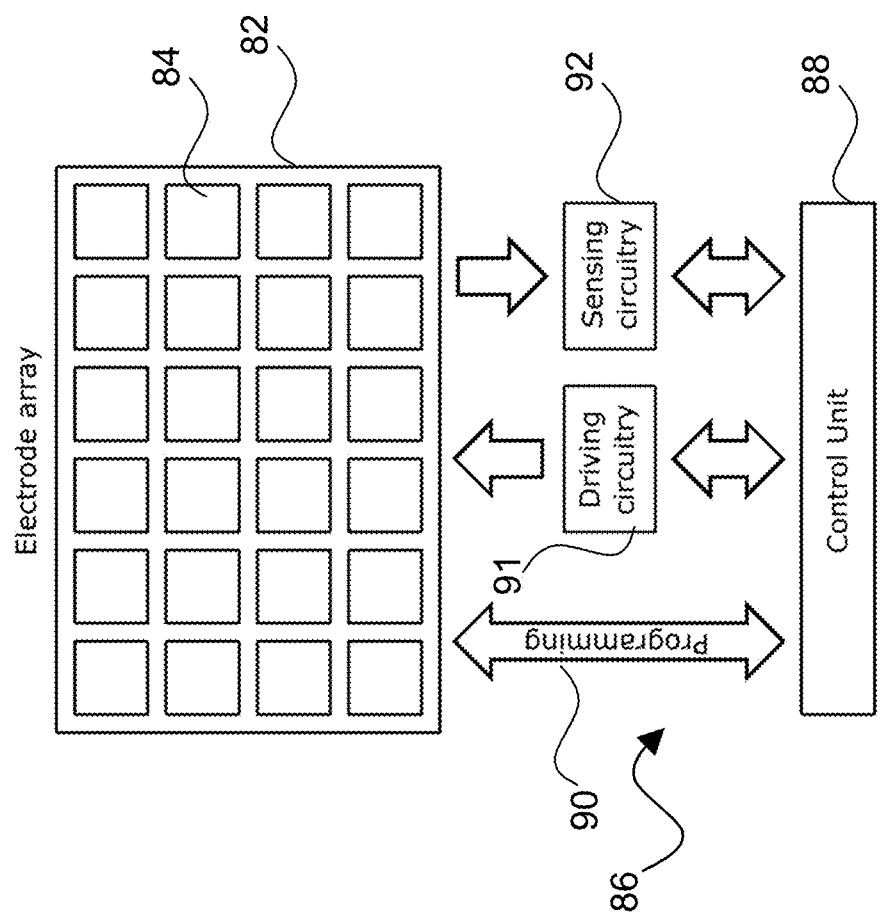
FIG. 15 is a drawing depicting an exemplary control system for controlling the exemplary electrode array of FIGS. 13 and 14.

FIG. 15 is a drawing depicting an exemplary control system 86 for controlling the exemplary electrode array 82 of FIGS. 13 and 14. The operation is governed by a main control unit 88. The control unit 88 provides programming signals 90 to the electrode array, which correspond to the select line signals to open and close the electronic switches of the programming circuitry as described above to set the connection states of the electrode elements 84. The main control unit further 88 controls for the driving mode (FNCA above) via drive circuitry 91, and controls the sensing mode via sensing circuitry 92. In this manner, the control unit provides drive signals to electrode elements in the driving mode via the drive circuitry, and can receive sense signals from electrode elements in the sensing mode via the sensing circuitry.

Figure 16:
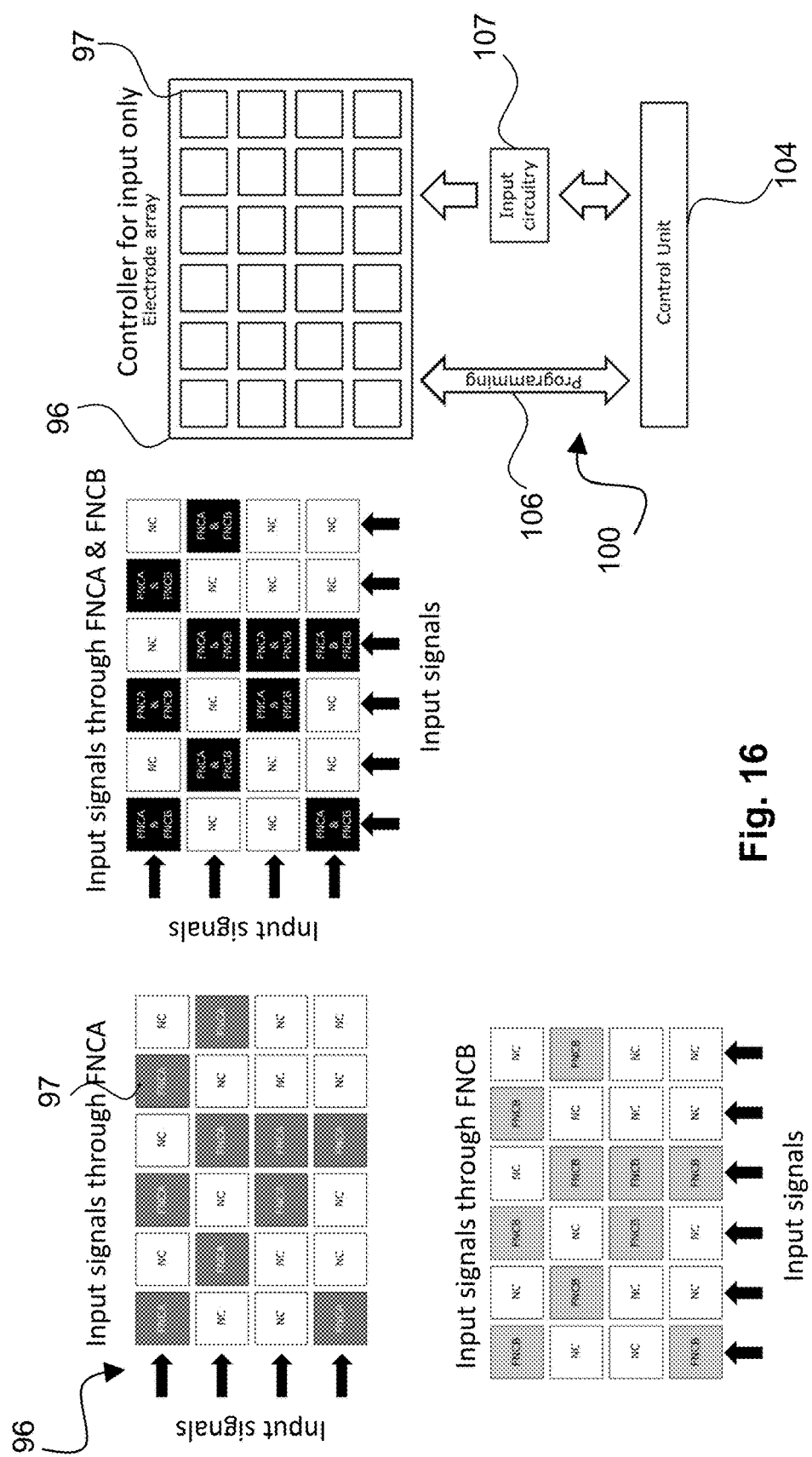
FIG. 16 is a drawing depicting an example of an electrode pattern and programming of an electrode array of electrode elements, that is used exclusively as an input mode device.

In applying the above principles, different applications of an array element device may be devised. For example, FIG. 16 is a drawing depicting an example of an electrode pattern and programming of an electrode array 96 of electrode elements 97, that is used exclusively as an input mode device. Examples of such devices may include an electronic driver, an emitter, an actuator, or like devices. Such devices operate exclusively in an input mode, in which input signals exclusively are applied to the electrode elements to selectively accomplish the performance function of the device. Examples of such devices may include a driving device that drives a touch panel, an emitter for emitting signals as an antenna, or exciting actuators (e.g., mechanical actuators, piezoelectric actuators, lights). FIG. 16 further illustrates an exemplary control system 100 for controlling such an input mode device. The input mode device operation is governed by an input device control unit 104. The control unit 104 provides programming signals 106 to the electrode array 96, which correspond to the select line signals to open and close the electronic switches of the programming circuitry as described above to set the connection states of the electrode elements 97. The control unit 104 further controls for signal emission via input circuitry 107 that provides drive signals over at least one of the function lines. Electrode elements that are not in the input mode are inactive in the NC state.

Figure 17:
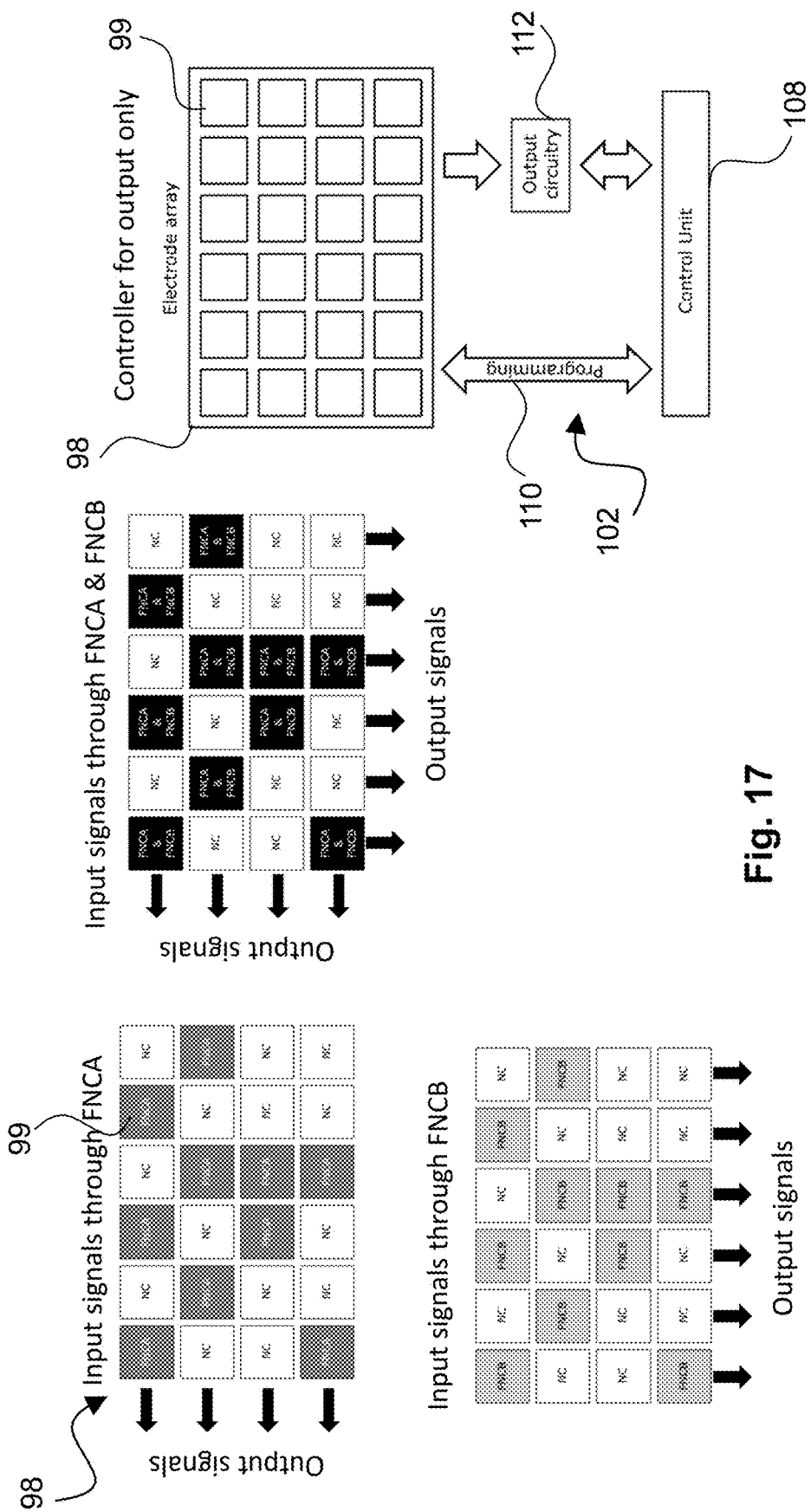
FIG. 17 is a drawing depicting an example of an electrode pattern and programming of an electrode array of electrode elements, that is used exclusively as an output mode device.

As another example, FIG. 17 is a drawing depicting an example of an electrode pattern and programming of an electrode array 98 of electrode elements 99, that is used exclusively as an output mode device. Examples of such devices may include a sensor, a signal receiver, a reader, or like devices. Such devices operate exclusively in an output mode, in which output signals exclusively are read from the electrode array to selectively accomplish the performance function of the device. Examples of such devices may include a sensing device that acts as a sensor for a touch panel, a receiver for receiving signals as part of an antenna, and a reader that quantifies action of an actuator. FIG. 17 further illustrates an exemplary control system 102 for controlling such an output mode device. The output mode device operation is governed by an output device control unit 108. The control unit 108 provides programming signals 110 to the electrode array 98, which correspond to the select line signals to open and close the electronic switches of the programming circuitry as described above to set the connection states of the electrode elements 99. The control unit 108 further controls for signal readout via output circuitry 112 that reads signals over at least one of the SEN lines. Electrode elements that are not in the output mode are inactive in the NC state.

FIGS. 16 and 17 illustrate three alternative methods for operation of an input mode device and an output mode device. As illustrated, in these two modes, the electrode elements in the array are either connected to only one function line, which can be FNCA or FNCB distinctly, or disconnected in the NC state. Alternatively, the electrodes could be connected to both FNCA and FNCB if both functions lines are going to be driven with the same signals (this could be useful, for example, to reduce electrical resistance, by using the FNCA and FNCB networks in parallel with the same driving signal), or disconnected in the NC state. This is in contrast to what is described with respect to FIGS. 13-15, in which the electrode elements could be connected to FNCA, FNCB or disconnected (NC), whereby FNCA and FNCB may be different functions, and the electrode array may accomplish concurrently two different functions on different electrodes.

Figure 18:
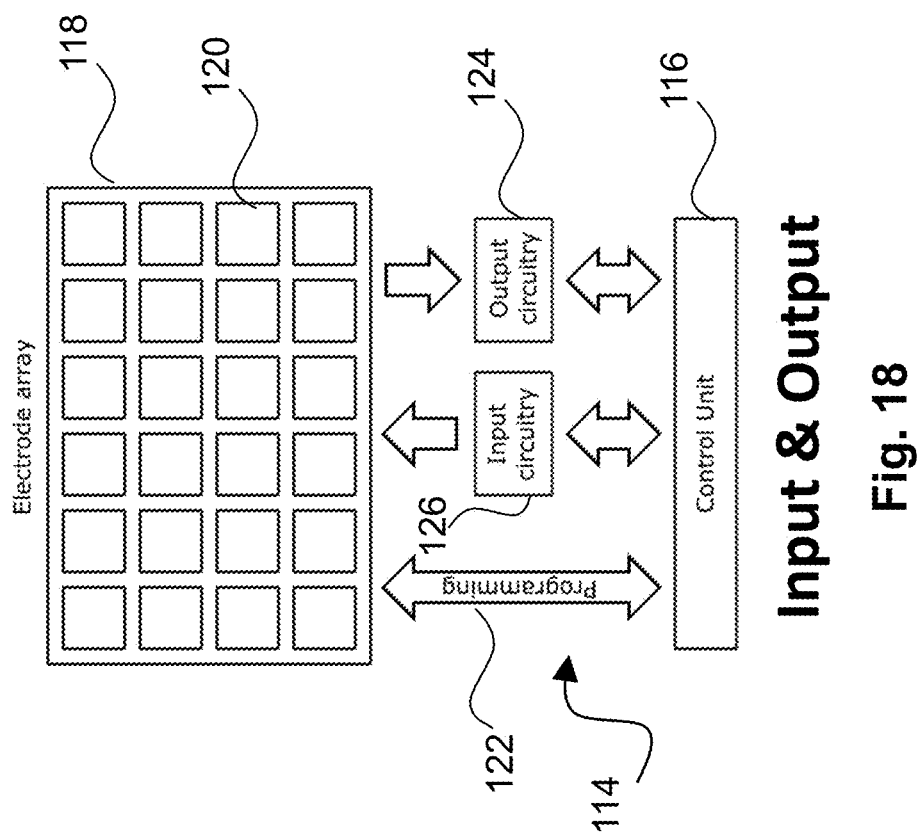
FIG. 18 is a drawing depicting an exemplary control system for controlling a switchable electrode array system that sequentially can be operated in an input mode and an output mode.

In a single function application like in the input or output mode devices of FIGS. 16 and 17, the controller 100 or 102 does not need to provide the two functions shown in FIG. 15, but may provide just a single function. Alternatively, as illustrated in FIG. 18, a single controller 114 could switch the device between operating as an input mode device and an output mode device, i.e., to act at sometimes in an input mode, and at other times in an output mode, but not both modes concurrently. In such a sequential mode device, the operation of the controller 114 is governed by a mode switching control unit 116. The control unit 116 provides programming signals 122 to the electrode array 118, which correspond to the select line signals to open and close the electronic switches of the programming circuitry as described above to set the connection states of the electrode elements 120. The control unit 116 further controls for signal emission via output circuitry 124 that reads signals from at least one of the function lines. In addition, the control unit 116 further controls for signal emission via input circuitry 126 that provides drive signals over at least one of the function lines. Again, the device can be switched between operating as an input mode device and an output mode device, to act at sometimes in an input mode and at other times in an output mode, but not both modes concurrently. Electrode elements that are not in the input/output mode are inactive in the NC state.

For example, the controller may place the electrode array in an input mode and drive some acoustic or RF emitters, and subsequently switch to an output mode to receive acoustic or RF echoes, like in sonar or radar devices. In another example, the controller may place the electrode array in an input mode to charge all the electrodes to a certain electrical potential, and subsequently switch to an output sensing mode to read charges from the electrodes, like in a self-capacitance touch panel. The input and output modes, therefore, may be performed sequentially (as opposed to concurrently). The controller 116 accordingly operates sequentially in conjunction with both output circuitry 124 and input circuitry 126, as illustrated in FIG. 18, and these circuitries work orthogonally in time as the device is switched sequentially between modes.

The various embodiments of this disclosure have advantages over conventional configurations, in that a matrix or array of electrodes is provided in which individual electrode elements can be selectively connected to and disconnected from control signal lines. Depending upon the precise configuration and desired application, individual electrode elements can be selectively connected to and disconnected from either one of, both, or neither one of a pair of control function lines, or may be connected to and disconnected from a single function line. Accordingly, electrode control patterns may be achieved other than row-wise or column-wise as is conventional. In addition, a given programmed connection state is stable in the sense that the connection state will be maintained so long as the associated programming capacitor maintains or preserves the programmed charge, and such stability can be enhanced by a refresh operation. The stable programming results in enhanced control of the individual electrode elements.

An aspect of the invention, therefore, is an enhanced electrode array device having integrated programming circuitry within the unit cells for stable connection of individual electrode elements of the unit cells to one or more control signal lines. In exemplary embodiments, the electrode array device includes an array of unit cells that are arranged in a two-dimensional array of rows and columns. Each unit cell includes an individual electrode element that is electrically connectable to at least one function line; and programming circuitry that is integrated into the unit cell and is operable to place the unit cell in a plurality of connection states corresponding to different states of electrical connection or disconnection to the at least one function line. The further wherein the unit cells are individually selectable for programming and operation in one of the plurality of connection states. The electrode array device may include one or more of the following features, either individually or in combination.

In an exemplary embodiment of the electrode array device, the programming circuitry comprises a first storage element; a first electronic switch that is connected between a first function line and the first storage element; and a second electronic switch connected between the first storage element and the individual electrode element. During a first programming mode the first electronic switch is in an on state and a current flow from the first function line through the first electronic switch charges the first storage element. The charge on the first storage element maintains the second electronic switch in an on state, whereby the unit cell is in a first connection state in which the individual electrode element is connected to the first function line.

In an exemplary embodiment of the electrode array device, the programming circuitry further comprises a second storage element; a third electronic switch that is connected between a second function line and the second storage element; and a fourth electronic switch connected between the second storage element and the individual electrode element. During a second programming mode the third electronic switch is in an on state and a current flow from the second function line through the third electronic switch charges the second storage element. The charge on the second storage element maintains the fourth electronic switch in an on state, whereby the unit cell is in a second connection state in which the individual electrode element is connected to the second function line.

In an exemplary embodiment of the electrode array device, the electronic switches are thin film transistors and the storage elements are capacitors.

In an exemplary embodiment of the electrode array device, a gate of the first electronic switch is connected to a first select line for programming the unit cell for the first connection state, and a gate of the third electronic switch is connected to a second select line for programming the unit cell for the second connection state.

In an exemplary embodiment of the electrode array device, the first and second the select lines are perpendicular to each other, and the first function line is perpendicular to the first select line and the second function line is perpendicular to the second select line.

In an exemplary embodiment of the electrode array device, the thin film transistors are n-type transistors.

Another aspect of the invention is a display system comprising a touch panel comprising an electrode array device according to any of the embodiments, wherein the unit cells are operable in the first connection state corresponding to a driving mode and are operable in the second connection state corresponding to a sensing mode; a touch panel controller that generates control signals for operation of the touch panel and reads sense signals generated by the touch panel during the sensing mode; and a display driver that generates control signals for display functionality when the touch panel is in the driving mode. The display and touch functionality may be integrated into a common layer within the display system to form an in-cell touch panel.

Another aspect of the invention is an input mode device comprising an electrode array device according to any of the embodiments, wherein for each input mode device unit cell the programming circuitry is operable to place the unit cell in the first connection state corresponding to an input mode in which the unit cell is connected to at least one input function line, and a second connection state in which the unit cell is disconnected from the at least one input function line.

An input mode device control system is configured to control connection states of the input mode device unit cells.

Another aspect of the invention is an output mode device comprising an electrode array device according to any of the embodiments, wherein for each output mode device unit cell the programming circuitry is operable to place the unit cell in the first connection state corresponding to an output mode in which the unit cell is connected to at least one output function line, and a second connection state in which the unit cell is disconnected from the at least one output function line. An output mode device control system is configured to control connection states of the output mode device unit cells.

Another aspect of the invention is a method of operating an electrode array device having integrated programming circuitry within the unit cells for stable connection of individual electrode elements of the unit cells to one or more control signal lines. In exemplary embodiments, the method includes the steps of: providing an electrode array device according to any of the embodiments; electronically selecting one or more unit cells, and for the selected unit cells performing the steps of: operating the selected unit cells in a first programming mode in which the programming circuitry of the selected unit cells is charged via electrical connection to a first function line; electrically disconnecting the programming circuitry of the selected unit cells from the first function line; and operating the charged unit cells in a first connection state in which the charge of the programming circuitry maintains an electrical connection between individual electrode elements of the charged unit cells and the first function line. The method may include one or more of the following features, either individually or in combination.

In an exemplary embodiment of the method of operating an electrode array device, the method further may include electronically selecting another one or more unit cells, and for the selected unit cells performing the steps of: operating the selected unit cells in a second programming mode in which the programming circuitry of the selected unit cells is charged via electrical connection to a second function line; electrically disconnecting the programming circuitry of the selected unit cells from the second function line; and operating the charged unit cells in a second connection state in which the charge of the programming circuitry maintains an electrical connection between individual electrode elements of the charged unit cells and the second function line.

In an exemplary embodiment of the method of operating an electrode array device, the method further may include connecting program circuitry of one or more unit cells having charged programming circuitry to the function line to which the individual electrode element is electrically connected; and grounding the function line to which the individual electrode element is electrically connected line to discharge the programming circuitry, thereby electrically disconnecting the individual electrode element from said function line.

In an exemplary embodiment of the method of operating an electrode array device, the method further may include performing the method as to unit cells that have been disconnected to re-program one or more of the disconnected unit cells.

In an exemplary embodiment of the method of operating an electrode array device, the method further may include performing a refresh operation to maintain the charge on the charged programming circuitry.

In an exemplary embodiment of the method of operating an electrode array device, wherein the array element device is a touch panel device, and the first connection state corresponds to a driving mode for display functions and the second connection state corresponds to a sensing mode for sensing an object that operates the touch panel.

In an exemplary embodiment of the method of operating an electrode array device, the array element device is an input mode device, and the first connection state corresponds to an input mode, and the second connection state corresponds to a not-connected state.

In an exemplary embodiment of the method of operating an electrode array device, the array element device is an output mode device, and the first connection state corresponds to an output mode, and the second connection state corresponds to a not-connected state.

In an exemplary embodiment of the method of operating an electrode array device, a first portion of unit cells is programmed and operated in the first connection state for electrical connection to the first function line, and a second portion of unit cells different from the first portion is programmed and operated for electrical connection to the second function line.

In an exemplary embodiment of the method of operating an electrode array device, a third portion of unit cells is maintained in a not-connected state in which there is no electrical connection between the individual electrode elements and a function line.

In an exemplary embodiment of the method of operating an electrode array device, a fourth portion of unit cells is programmed and operated simultaneously in the first connection state and second connection state for electrical connection to both the first and second function lines.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to devices and applications including arrays of electrodes, and programmable arrays of electrodes in particular in which the connections of the electrode elements to external signal lines can be electrically programmed. Such type of electrode arrays may find application in a range of electronic devices and equipment, including for example touch panels, sensors, actuators, displays, and RF antennae arrays.

REFERENCE SIGNS LIST

10—transparent substrate
11—sensing electrode

12—voltage source
13—input object
14—capacitor
15—current sensor
20—drive electrode
21—sense electrode
22—voltage source
23—mutual coupling capacitor
24—current measurement device
27—drive electrode
28—sense electrode
30—pixel arrangement
32—individual pixels
34—touch panel (TP) elements
36—basic unit cell
38—exemplary array
40—exemplary LCD display system
40a—another exemplary LCD display system
42—touch panel
44—display
46—cover glass
48—optically clear adhesive (OCA) layer
50—front polarizer
52—color filter
54—rear polarizer
58—touch panel controller
60—display driver
62—main panel processor
64—common electrode layer
70—unit cell
72—individual electrode element
74—control circuitry
80—exemplary electrode array device
82—exemplary electrode array
84—individual electrode elements
88—main control unit
91—drive circuitry
92—sensing circuitry
96—input mode device electrode array
97—electrode elements of the input mode device electrode array
98—output mode device electrode array
99—electrode elements of the output mode device electrode array
100—control system for input mode device
102—control system for output mode device
104—input mode device control unit
106—programming signals
107—input circuitry
108—output mode device control unit
110—programming signals
112—output circuitry
114—sequential mode switching control system
116—control unit for sequential mode switching control system
118—electrode array for sequential mode switching device
120—electrode elements
122—programming signals
124—input circuitry
126—output circuitry
M1—first transistor
M2—second transistor
M3—third transistor
M4—fourth transistor
C1—first capacitor
C2—second capacitor
FNCA—first function line
FNCB—second function line
SELC—first select line
SELR—second select line

What is claimed is:

1. An electrode array device comprising:
an array of unit cells that are arranged in a two-dimensional array of rows and columns;
wherein each unit cell comprises:
an individual electrode element that is electrically connectable to at least one function line; and
programming circuitry that is integrated into the unit cell and is operable to place the unit cell in a plurality of connection states corresponding to different states of electrical connection or disconnection to the at least one function line;
further wherein the unit cells are individually selectable for programming and operation in one of the plurality of connection states;
wherein the programming circuitry comprises:
a first storage element;
a first electronic switch that is connected between a first function line and the first storage element; and
a second electronic switch that is connected between the first storage element and the individual electrode element;
wherein during a first programming mode the first electronic switch is in an on state and a current flow from the first function line through the first electronic switch charges the first storage element;
wherein the charge on the first storage element maintains the second electronic switch in an on state, whereby the unit cell is in a first connection state in which the individual electrode element is connected to the first function line;
wherein during a second programming mode the first electronic switch is in an on state and the storage element discharges through the first function line; and
wherein the discharged first storage element maintains the second electronic switch in an off state, whereby the unit cell is in a second connection state in which the individual electrode element is disconnected from the first function line.

2. An input mode device comprising:
an electrode array device according to claim 1, wherein for each input mode device unit cell the programming circuitry is operable to place the unit cell in the first connection state corresponding to an input mode in which the unit cell is connected to at least one input function line, and the second connection state in which the unit cell is disconnected from the at least one input function line; and
an input mode device control system configured to control connection states of the input mode device unit cells.

3. An output mode device comprising:
an electrode array device according to claim 1, wherein for each output mode device unit cell the programming circuitry is operable to place the unit cell in the first connection state corresponding to an output mode in which the unit cell is connected to at least one output function line, and the second connection state in which the unit cell is disconnected from the at least one output function line; and
an output mode device control system configured to control connection states of the output mode device unit cells.

4. The electrode array device of claim 1, wherein the programming circuitry further comprises:

a second storage element;
a third electronic switch that is connected between a second function line and the second storage element; and
a fourth electronic switch connected between the second storage element and the individual electrode element;
wherein during the second programming mode the third electronic switch is in an on state and a current flow from the second function line through the third electronic switch charges the second storage element; and
wherein the charge on the second storage element maintains the fourth electronic switch in an on state, whereby the unit cell is in the second connection state in which the individual electrode element is connected to the second function line.

5. The electrode array device of claim 4, wherein the electronic switches are thin film transistors and the storage elements are capacitors.

6. The electrode array device of claim 5, wherein a gate of the first electronic switch is connected to a first select line for programming the unit cell for the first connection state, and a gate of the third electronic switch is connected to a second select line for programming the unit cell for the second connection state.

7. The electrode array device of claim 6, wherein the first and second the select lines are perpendicular to each other, and the first function line is perpendicular to the first select line and the second function line is perpendicular to the second select line.

8. The electrode array device of claim 5, wherein the thin film transistors are n-type transistors.

9. A display system comprising:
a touch panel comprising an electrode array device according to claim 1, wherein the unit cells are operable in the first connection state corresponding to a driving mode and are operable in the second connection state corresponding to a sensing mode;
a touch panel controller that generates control signals for operation of the touch panel and reads sense signals generated by the touch panel during the sensing mode; and
a display driver that generates control signals for display functionality when the touch panel is in the driving mode.

10. The display system of claim 9, wherein display and touch functionality are integrated into a common layer within the display system to form an in-cell touch panel.

11. A method of operating an electrode array device comprising the steps of:
providing an electrode array device comprising an array of unit cells that are arranged in a two-dimensional array of rows and columns; wherein each unit cell comprises an individual electrode element that is electrically connectable to at least one function line, and programming circuitry that is integrated into the unit cell and is operable to place the unit cell in a plurality of connection states corresponding to different states of electrical connection or disconnection to the at least one function line;
wherein the programming circuitry comprises:
a first storage element;
a first electronic switch that is connected between a first function line and the first storage element; and
a second electronic switch that is connected between the first storage element and the individual electrode element;
electronically selecting one or more unit cells, and for the selected unit cells performing the steps of:
operating the selected unit cells in a first programming mode in which the programming circuitry of the selected unit cells is charged via electrical connection to a first function line;
wherein during the first programming mode the first electronic switch is in an on state and a current flow from the first function line through the first electronic switch charges the first storage element, and wherein the charge on the first storage element maintains the second electronic switch in an on state, whereby the unit cell is in a first connection state in which the individual electrode element is connected to the first function line; and;
operating the selected unit cells in a second programming mode during which the first electronic switch is in an on state and the storage element discharges through the first function line, wherein the discharged first storage element maintains the second electronic switch in an off state, whereby the unit cell is in a second connection state in which the individual electrode element is disconnected from the first function line.

12. The method of operating an electrode array device of claim 11, further comprising performing a refresh operation to maintain the charge on the charged programming circuitry.

13. The method of operating an electrode array device of claim 11, wherein the array element device is a touch panel device, and the first connection state corresponds to a driving mode for display functions and the second connection state corresponds to a sensing mode for sensing an object that operates the touch panel.

14. The method of operating an electrode array device of claim 11, wherein the array element device is an input mode device, and the first connection state corresponds to an input mode, and the second connection state corresponds to a not-connected state.

15. The method of operating an electrode array device of claim 11, wherein the array element device is an output mode device, and the first connection state corresponds to an output mode, and the second connection state corresponds to a not-connected state.

16. The method of operating an electrode array device of claim 11, further comprising:
electronically selecting another one or more unit cells, and for the selected unit cells performing the steps of:
operating the selected unit cells in the second programming mode in which the programming circuitry of the selected unit cells is charged via electrical connection to a second function line;
electrically disconnecting the programming circuitry of the selected unit cells from the second function line; and
operating the charged unit cells in a second connection state in which the charge of the programming circuitry maintains an electrical connection between individual electrode elements of the charged unit cells and the second function line.

17. The method of operating an electrode array device of claim 11, further comprising:
connecting program circuitry of one or more unit cells having charged programming circuitry to the function line to which the individual electrode element is electrically connected; and
grounding the function line to which the individual electrode element is electrically connected line to discharge the programming circuitry, thereby electrically disconnecting the individual electrode element from said function line.

18. The method of operating an electrode array device of claim 17, further comprising performing the method as recited in claim 11 as to unit cells that have been disconnected to re-program one or more of the disconnected unit cells.

19. The method of operating an electrode array device of claim 16, wherein a first portion of unit cells is programmed and operated in the first connection state for electrical connection to the first function line, and a second portion of unit cells different from the first portion is programmed and operated for electrical connection to the second function line.

20. The method of operating an electrode array device of claim 19, wherein a third portion of unit cells is maintained in a not-connected state in which there is no electrical connection between the individual electrode elements and a function line.

21. The method of operating an electrode array device of claim 20, wherein a fourth portion of unit cells is programmed and operated simultaneously in the first connection state and second connection state for electrical connection to both the first and second function lines.

* * * * *